United States Patent
Fini et al.

(10) Patent No.: US 11,717,989 B2
(45) Date of Patent: Aug. 8, 2023

(54) TREATED PLASTIC GRANULES

(71) Applicant: Arizona Board of Regents on behalf of Arizona State University, Scottsdale, AZ (US)

(72) Inventors: Elham Fini, Phoenix, AZ (US); Sk Faisal Kabir, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 17/775,122

(22) PCT Filed: Nov. 12, 2020

(86) PCT No.: PCT/US2020/060193
§ 371 (c)(1),
(2) Date: May 6, 2022

(87) PCT Pub. No.: WO2021/097068
PCT Pub. Date: May 20, 2021

(65) Prior Publication Data
US 2022/0355512 A1 Nov. 10, 2022

Related U.S. Application Data

(60) Provisional application No. 62/936,321, filed on Nov. 15, 2019.

(51) Int. Cl.
*B29B 9/16* (2006.01)
*B29B 13/08* (2006.01)
(Continued)

(52) U.S. Cl.
CPC ............... *B29B 9/16* (2013.01); *B29B 13/08* (2013.01); *C04B 26/26* (2013.01);
(Continued)

(58) Field of Classification Search
CPC ............... C04B 40/0039; C04B 26/26; B29B 2009/163; B29B 13/08; C08K 3/042; C08K 2201/003; C08K 2201/011; C09D 7/61
(Continued)

(56) References Cited

U.S. PATENT DOCUMENTS

| | | | |
|---|---|---|---|
| 5,041,310 A | 8/1991 | Williams et al. | |
| 2007/0149625 A1* | 6/2007 | Lark | C08J 11/08 521/40 |

(Continued)

FOREIGN PATENT DOCUMENTS

| | | | | |
|---|---|---|---|---|
| CN | 106752056 A | 5/2017 | | |
| CN | 108949282 A | * 12/2018 | ............... | C08F 2/38 |

OTHER PUBLICATIONS

AASHTO T313-19, 2019. Standard Method of Test for Determining the Flexural Creep Stiffness of Asphalt Binder Using the Bending Beam Rheometer (BBR). American Association of State Highway and Transportation Officials, Washington, DC, 22 pages.

(Continued)

*Primary Examiner* — Tri V Nguyen
(74) *Attorney, Agent, or Firm* — Fish & Richardson P.C.

(57) ABSTRACT

Preparing hybrid-treated plastic particles from waste plastic includes combining waste plastic particles with bio-oil to yield a mixture, irradiating the mixture with microwave radiation to yield oil-treated plastic particles, and contacting the oil-treated plastic particles with carbon-containing nanoparticles to yield hybrid-treated plastic particles. The hybrid-treated plastic particles have a bio-oil modified surface and a coating comprising carbon-containing nanoparticles on the bio-oil modified surface of the plastic particle. In some examples, a diameter of the plastic particle is in a range between 250 m and 750 m, and a thickness of the coating is in a range of 1 nm to 20 nm. A modified binder (Continued)

includes an asphalt binder or a concrete binder and a multiplicity of the treated plastic particles. The modified binder typically includes 5 wt % to 25 wt % of the hybrid-treated plastic particles.

19 Claims, 19 Drawing Sheets

(51) Int. Cl.
    *C04B 26/26*     (2006.01)
    *C08K 3/04*     (2006.01)
    *C09D 7/61*     (2018.01)

(52) U.S. Cl.
    CPC ........ *B29B 2009/163* (2013.01); *C08K 3/042* (2017.05); *C08K 2201/003* (2013.01); *C08K 2201/011* (2013.01); *C09D 7/61* (2018.01)

(58) Field of Classification Search
    USPC ................................................ 428/407, 394
    See application file for complete search history.

(56) References Cited

U.S. PATENT DOCUMENTS

| | | | |
|---|---|---|---|
| 2011/0219679 A1* | 9/2011 | Budarin | C10C 5/00 422/186 |
| 2012/0059084 A1 | 3/2012 | Brown et al. | |
| 2017/0166722 A1 | 6/2017 | Zhamu et al. | |
| 2021/0002173 A1 | 1/2021 | Lee et al. | |
| 2021/0247285 A1 | 8/2021 | Fini et al. | |
| 2022/0089497 A1 | 3/2022 | Burton et al. | |
| 2022/0267211 A1 | 8/2022 | Fini et al. | |

OTHER PUBLICATIONS

AASHTO T315-12, 2012. Standard Method of Test for Determining the Rheological Properties of Asphalt Binder Using a Dynamic Shear Rheometer (DSR). American Association of State Highway and Transportation Officials, Washington, DC, 32 pages.

Abdelrahman, M., Katti, D.R., Ghavibazoo, A., Upadhyay, H.B., Katti, K.S., 2014. Engineering physical properties of asphalt binders through nanoclay—asphalt interactions. J. Mater. Civ. Eng., 26(12):04014099, 9 pages.

Ameri, M., Nasr, D., 2017. Performance properties of devulcanized waste PET modified asphalt mixtures. Petroleum Science and Technology 35(1), 99-104.

Andanson, J.M., Kazarian, S.G., 2008. In situ ATR-FTIR Spectroscopy of poly(ethylene terephthalate) subjected to high-temperature methanol. Macromol. Symp. 265:195-204.

Anderson, R.M., King, G.N., Hanson, D.I., Blankenship, P.B., 2011. Evaluation of the relationship between asphalt binder properties and non-load related cracking. Asphalt Paving Technology Conference 2011, Tampa, FL, Mar. 27-30, 2011; Journal of the Association of Asphalt Paving Technologists, 2011, 80:615-663.

ASTM-D257, 1999. D 257-1999. Standard Test Methods for DC Resistance or Conductance of Insulating Materials. ATSM International, West Conshohocken, PA, 18 pages.

ASTM-D36, 2014. Standard test, method for softening point of bitumen (ring-and-ball apparatus). ASTM International, West Conshohocken, PA, 5 pages.

ASTM-D4402, 2015. Standard test method for viscosity determination of asphalt at elevated temperatures using a rotational viscometer. ASTM International, West Conshohocken, PA, 4 pages.

ASTM-D6373-13, 2013. Standard Specification for Performance Graded Asphalt Binder. ASTM International, West Conshohocken, PA, 5 pages.

ASTM-D7175-15, 2015. Standard Test Method for Determining the Rheological Properties of Asphalt Binder Using a Dynamic Shear Rheometer. ASTM International, West Conshohocken, PA, 16 pages.

Balasubramanian, V., Natarajan, K., Rajeshkannan, V., Perumal, P., 2014. Enhancement of in vitro high-density polyethylene (HDPE) degradation by physical, chemical, and biological treatments. Environ Sci Pollut Res. 21(21):12549-12562.

Barjasteh, E., Sutanto, C., Nepal, D., 2019. Conductive Polyamide—Graphene Composite Fabric via Interface Engineering. Langmuir 35(6):2261-2269.

Bert, V., Allemon, J., Sajet, P., Dieu, S., Papin, A., Collet, S., Gaucher, R., Chalot, M., Michiels, B., Raventos, C., 2017. Torrefaction and pyrolysis of metal-enriched poplars from phytotechnologies: Effect of temperature and biomass chlorine content on metal distribution in end-products and valorization options. Biomass and Bioenergy 96:1-11.

Buekens, A., Huang, H., 1998. Catalytic plastics cracking for recovery of gasoline-range hydrocarbons from municipal plastic wastes. Resources, Conservation and Recycling 23(3):163-181.

Chen, Z., Hay, J.N., Jenkins, M., 2012. FTIR spectroscopic analysis of poly(ethylene terephthalate) on crystallization. European Polymer Journal 48(9):1586-1610.

Chong, S., Chiu, H.-L., Liao, Y.-C., Hung, S.-T., Pan, G.-T., 2015. Cradle to Cradle® design for 3D printing. Chemical Engineering 45:1669-1674.

Das, P., Tiwari, P., 2018. Valorization of packaging plastic waste by slow pyrolysis. Resources, Conservation and Recycling 128:69-77.

Donlan, R.M., 2002. Biofilms: microbial life on surfaces. Emerging Infectious Diseases 8(9):881-890.

Ephraim, A., Minh, D.P., Lebonnois, D., Peregrina, C., Sharrock, P., Nzihou, A., 2018. Co-pyrolysis of wood and plastics: Influence of plastic type and content on product yield, gas composition and quality. Fuel 231:110-117.

Hashem, F.S., Razek, T.A., Mashout, H.A., 2019. Rubber and plastic wastes as alternative refused fuel in cement industry. Construction and Building Materials 212:275-282.

He, M., Xiao, B., Hu, Z., Liu, S., Guo, X., Luo, S., 2009. Syngas production from catalytic gasification of waste polyethylene: Influence of temperature on gas yield and composition. International Journal of Hydrogen Energy 34(3):1342-1348.

Hosseinnezhad, S., Fini, E.H., Sharma, B.K., Basti, M., Kunwar, B., 2015. Physiochemical characterization of synthetic bio-oils produced from bio-mass: a sustainable source for construction bio-adhesives. RSC Advances 5(92):75519-75527.

Hosseinnezhad, S., Kabir, S. F., Oldham, D., Mousavi, M., & Fini, E. H. (2019). Surface functionalization of rubber particles to reduce phase separation in rubberized asphalt for sustainable construction. Journal of Cleaner Production, 225:82-89.

Hundertmark, T., Mayer, M., McNally, C., Simons, T., Witte, C., 2018. How plastics-waste recycling could transform the chemical industry, McKinsey & Company, 11 pages.

Jenkins, S., Quer, A.M.i., Fonseca, C., Varrone, C., 2020. Microbial Degradation of Plastics: New Plastic Degraders, Mixed Cultures and Engineering Strategies. Soil Microenvironment for Bioremediation and Polymer Production, Chapter 12, pp. 213-238.

Jung, M.R., Horgen, F.D., Orski, S.V., Rodriguez, V., Beers, K.L., Balazs, G.H., Jones, T.T., Work, T.M., Brignac, K.C., Royer, S.-J., 2018. Validation of ATR FT-IR to identify polymers of plastic marine debris, including those ingested by marine organisms. Marine Pollution Bulletin 127:704-716.

Karnati, S.R., Hgsaa, B., Zhang, L., Fini, E.H., 2020. Developing carbon nanoparticles with tunable morphology and surface chemistry for use in construction. Construction and Building Materials 262:120780, 10 pages.

Kathiresan, K., 2003. Polythene and plastics-degrading microbes from the mangrove soil. Revista de Biologia Tropical 51(3-4):629-633.

Konduri, M.K., Anupam, K.S., Vivek, U.S., DB, R.K., Narasu, M.L., 2010. Synergistic effect of chemical and photo treatment on the rate of biodegradation of high density polyethylene by indigenous fungal isolates. International Journal of Biotechnology and Biochemistry, 6(2):157-174.

Leng, Z., Sreeram, A., Padhan, R.K., Tan, Z., 2018. Value-added application of waste PET based additives in bituminous mixtures containing high percentage of reclaimed asphalt pavement (RAP). Journal of Cleaner Production 196:615-625.

(56) References Cited

OTHER PUBLICATIONS

Mani, M., Subash, C., Nagarajan, G., 2009. Performance, emission and combustion characteristics of a DI diesel engine using waste plastic oil. Applied Thermal Engineering 29(13):2738-2744.

Moghadas Nejad, F., Azarhoosh, A., Hamedi, G.H., 2014. Effect of high density polyethylene on the fatigue and rutting performance of hot mix asphalt—a laboratory study. Road Materials and Pavement Design 15(3):746-756.

Mousavi, M., S. F. Kabir, Sh. Hosseinnezhad, and E. H. Fini, 2019, Reaction Pathways for Surface Activated Rubber Particles, Resource Conservation, and Recycling, 149:292-300.

Muhamad, W., Othman, R., Shaharuddin, R.I., Irani, M.S., 2015. Microorganism as plastic biodegradation agent towards sustainable environment. Adv Environ Biol 9(13):8-13.

Mukherjee, A., Ruj, B., Gupta, P., Sadhukhan, A., 2020. A Study on Pyrolysis of Plastic Wastes for Product Recovery and Analysis, Urban Mining and Sustainable Waste Management. Springer, pp. 329-339.

O'Hare, L. A., Leadley, S., & Parbhoo, B., 2002. Surface physicochemistry of corona-discharge-treated polypropylene film. Surf. Interface Anal., 33(4):335-342.

Orhan, Y., Büyükgungör, H., 2000. Enhancement of biodegradability of disposable polyethylene in controlled biological soil. International Biodeterioration & Biodegradation 45(1-2):49-55.

Pinto, F., Costa, P., Gulyurtlu, I., Cabrita, I., 1999. Pyrolysis of plastic wastes. 1. Effect of plastic waste composition on product yield. Journal of Analytical and Applied Pyrolysis 51(1-2):39-55.

Poonyakan, A., Rachakomkij, M., Wecharatana, M., Smittakorn, W., 2018. Potential Use of Plastic Wastes for Low Thermal Conductivity Concrete. Materials 11(10):1938, 17 pages.

Rajib, A., Fini, E.H., 2020. Inherently Functionalized Carbon from Lipid and Protein—Rich Biomass to Reduce Ultraviolet-Induced Damages in Bituminous Materials. ACS Omega, 5(39):25273-25280.

Rossier, J., Bercier, P., Schwarz, A., Loridant, S., Girault, H., 1999. Topography, crystallinity and wettability of photoablated PET surfaces. Langmuir 15(15), 5173-5178.

Rummel, C.D., Jahnke, A., Gorokhova, E., KuRummel, C.D., Jahnke, A., Gorokhova, E., Kuhnel, D., Schmitt-Jansen, M., 2017. Impacts of biofilm formation on the fate and potential effects of microplastic in the aquatic environment. Environmental Science & Technology Letters 4(7):258-267.

Salas, M.Á., Pérez-Acebo, H., Calderón, V., Gonzalo-Orden, H., 2018. Bitumen modified with recycled polyurethane foam for employment in hot mix asphalt. Ingenieria e Investigación 38(1):60-66.

Sánchez, C., 2019. Fungal potential for the degradation of petroleum-based polymers: An overview of macro-and microplastics biodegradation. Biotechnology Advances, 40:107501, 12 pages.

Sangale, M.K., Shahnawaz, M., Ade, A.B., 2012. A review on biodegradation of polythene: the microbial approach. J Biorenied Biodeg 3(10):1-9.

Sangale, M.K., Shahnawaz, M., Ade, A.B., 2019. Potential of fungi isolated from the dumping sites mangrove rhizosphere soil to degrade polythene. Scientific Reports 9(1):5390, 11 pages.

Sarker, M., 2011. Converting waste plastic to hydrocarbon fuel materials. Energy Engineering 108(2)-35-43.

Schaefer, C.E., Kupwade-Patil, K., Ortega, M., Soriano, C., Büyüköztürk, O., White, A.E., Short, M.P., 2018. Irradiated recycled plastic as a concrete additive for improved chemo-mechanical properties and lower carbon footprint. Waste Management 71:426-439.

Shahnawaz, M., Sangale, M.K., Ade, A.B., 2019. Plastic Waste Disposal and Reuse of Plastic Waste, Bioremediation Technology for Plastic Waste. Springer, Chapter 3, pp. 21-30.

Sharma, B.K., Moser, B.R., Vermillion, K.E., Doll, K.M., Rajagopalan, N., 2014. Production, characterization and fuel properties of alternative diesel fuel from pyrolysis of waste plastic grocery bags. Fuel Processing Technology 122:79-90.

Shatanawi, K.M., Biro, S., Naser, M., Amirkhanian, S.N., 2013. Improving the rheological properties of crumb rubber modified binder using hydrogen peroxide. Road Materials and Pavement Design 14(3):723-734.

Singh, J., Gupta, K., 2014. Screening and identification of low density polyethylene (LDPE) degrading soil fungi isolated from polythene polluted sites around Gwalior City (MP). International Journal of Current Microbiology and Applied Sciences 3(6):443-448.

Stuart, B., 1996. Polymer crystallinity studied using Raman spectroscopy. Vibrational Spectroscopy 10(2):79-87.

Urbanek, A.K., Rymowicz, W., Mirończuk, A.M., 2018. Degradation of plastics and plastic-degrading bacteria in cold marine habitats. Applied Microbiology and Biotechnology 102(18):7669-7678.

Vijayakumar, S., Rajakumar, P., 2012. Infrared spectral analysis of waste pet samples. International Letters of Chemistry, Physics and Astronomy 4:58-65.

Wolkenhauer, A., Avramidis, G., Hauswald, E., Militz, H., Viöl, W., 2008. Plasma treatment of wood-plastic composites to enhance their adhesion properties. Journal of Adhesion Science and Technology 22(16):2025-2037.

Xu, S.Y., Zhang, H., He, P.J., Shao, L.M., 2011. Leaching behaviour of bisphenol A from municipal solid waste under landfill environment. Environmental Technology 32(11):1269-1277.

Zhang, J., Wang, X., Gong, J., Gu, Z., 2004. A study on the biodegradability of polyethylene terephthalate fiber and diethylene glycol terephthalate. Journal of Applied Polymer Science 93(3):1089-1096.

Zheng, Y., Yanful, E.K., Bassi, A.S., 2005. A review of plastic waste biodegradation. Critical Reviews in Biotechnology 25(4):243-250.

Żuchowska, D., Hlavata, D., Steller, R., Adamiak, W., Meissner, W., 1999. Physical structure of polyolefin—starch blends after ageing. Polymer Degradation and Stability 64(2):339-346.

Lam et al. "Microwave vacuum pyrolysis of waste plastic and used cooking oil for simultaneous waste reduction and sustainable energy conversion: Recovery of cleaner liquid fuel and techno-economic analysis" Renewable and Sustainable Energy Reviews, vol. 115 (Aug. 31, 2019): pp. 1-13.

Mahari et al. "Production of value-added liquid fuel via microwave co-pyrolysis of used frying oil and plastic waste" Energy, vol. 162 (Aug. 6, 2018): pp. 309-317.

PCT/US2020/060193, International Search Report and Written Opinion (7 pages), (2021).

* cited by examiner

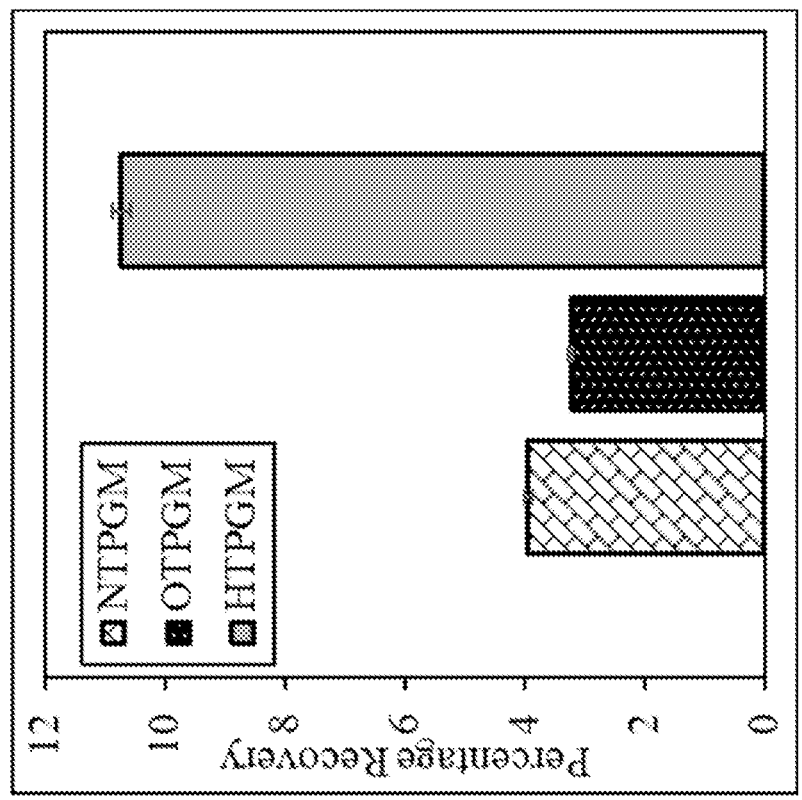
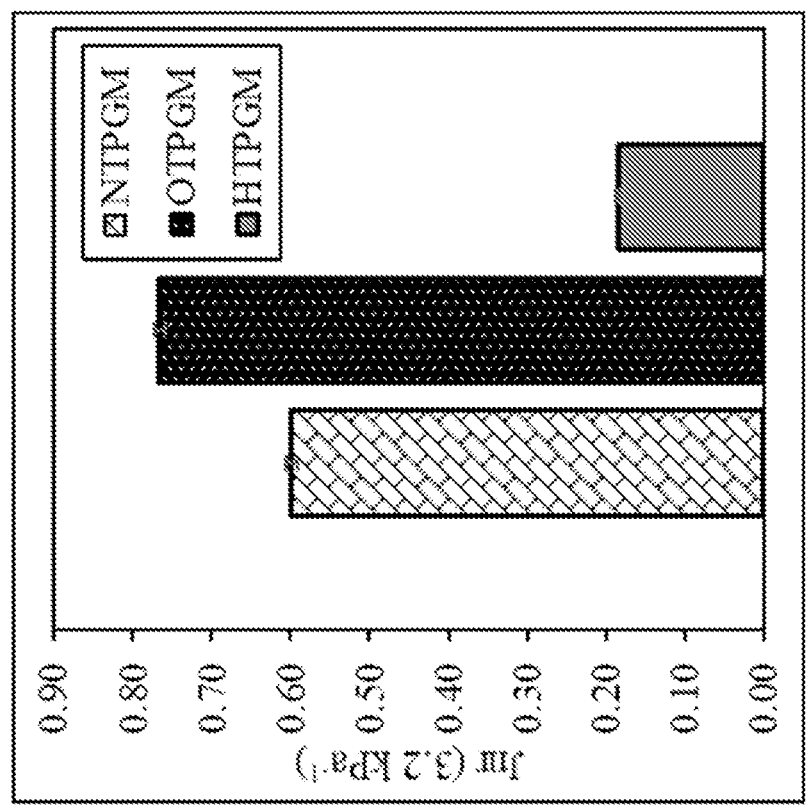
FIG. 12A
FIG. 12B

TREATED PLASTIC GRANULES

CROSS-REFERENCE TO RELATED APPLICATIONS

This application is a National Stage Application of International Application No. PCT/US2020/060193, filed Nov. 12, 2020, which claims the benefit of U.S. Patent Application No. 62/936,321 entitled "TREATED PLASTIC GRANULES" and filed on Nov. 15, 2019, both of which are incorporated herein by reference in their entirety.

STATEMENT OF GOVERNMENT SUPPORT

This invention was made with government support under 1928795 awarded by the National Science Foundation. The government has certain rights in the invention.

TECHNICAL FIELD

This invention relates to treating waste plastic to yield treated plastic granules for use in various applications.

BACKGROUND

Most plastics used throughout the world are petrochemical plastic derivatives, such as polyethylene (PE), polyethylene terephthalate (PET), polypropylene (PP), polystyrene (PS), and polyvinyl chloride (PVC). About 10% of total plastic materials are recycled, whereas about 40% end up in landfills, about 25% go to incineration or energy recovery, and about 20% are unaccounted for. These non-recycled plastic wastes are believed to have a life span of hundreds of years, and cause a variety of environmental problems.

SUMMARY

This disclosure describes a treatment for waste-plastic granules, as well as the resulting treated plastic granules (TPG). The plastic granules are treated using a bio-oil and a carbon coating to compatibilize the plastic granules with asphalt binder to both promote resource conservation and enhance pavement performance. In one example, the waste plastic includes mixed-color polyethylene terephthalate (PET), the bio-oil is derived from waste vegetable oil, and the carbon coating includes graphene nanoparticles.

To evaluate the extent of surface treatment of TPG, the formation of surface functional groups can be tracked using Fourier transform infrared spectroscopy and Raman spectroscopy, and their surface energy before and after treatment measured using inverse gas chromatography. The total surface energy of plastic increases by 49% after treatment-promoting interactions between plastics and binder, and the separation of plastics and binder was reduced by 86%. The viscosity of a binder with treated plastic is 56% lower than the same binder with non-treated plastic. A binder with treated plastic has increased resistance to fatigue cracking compared to binder with non-treated plastic. Low-temperature properties are also improved for binders with treated plastic relative to binders with non-treated plastic. The moisture-induced shear-thinning index shows that the presence of TPG in a beinder renders the binder less susceptible to moisture.

In a first general aspect, preparing treated plastic particles from waste plastic includes combining waste plastic particles with bio-oil to yield a mixture, and irradiating the mixture with microwave radiation to yield oil-treated plastic particles.

Implementations of the first general aspect can include one or more of the following features.

One implementation includes contacting the oil-treated plastic particles with carbon-containing nanoparticles to yield hybrid-treated plastic particles. The waste plastic particles can include mixed plastics (e.g., mixed-color polyethylene terephthalate). The bio-oil can be derived by waste vegetable oil. In some cases, the waste plastic particles and the bio-oil are combined in a mass ratio in a range of 2:1 to 1:2. The carbon-containing nanoparticles can include graphene nanoparticles.

In some cases, the first general aspect includes, after irradiating the mixture, allowing the mixture to cool and further irradiating the mixture to yield the oil-treated plastic particles. In certain cases, the first general aspect includes reducing a size of the oil-treated plastic particles before contacting the oil-treated plastic particles with the carbon-containing nanoparticles. Contacting the oil-treated plastic particles with the carbon-containing nanoparticles can include coating the oil-treated plastic particles with the carbon containing nanoparticles. A thickness of the coating is in a range between 1 nm and 20 nm or between 5 nm and 10 nm.

In a second general aspect, preparing a modified binder includes combining the hybrid-treated plastic particles of the first general aspect with a binder to yield the modified asphalt binder, wherein the binder comprises a concrete binder or an asphalt binder, and the modified binder comprises 5 wt % to 25 wt % of the hybrid-treated plastic particles.

Implementations of the second general aspect may include one or more of the following features.

In some cases, the modified binder includes 75 wt % to 95 wt % of the asphalt binder. In certain cases, the modified binder includes 10 wt % to 20 wt % of the hybrid-treated plastic particles and 80 wt % to 90 wt % of the asphalt binder.

In a third general aspect, a hybrid-treated plastic particle includes a plastic particle having a bio-oil modified surface, and a coating comprising carbon-containing nanoparticles on the bio-oil modified surface of the plastic particle.

Implementations of the third general aspect may include one or more of the following features.

A diameter of the plastic particle is typically in a range between 250 μm and 750 μm. In some cases, the carbon-containing nanoparticles comprise graphene nanoparticles. A thickness of the coating can be in a range of 1 nm to 20 nm or 5 nm to 15 nm.

In a fourth general aspect, a modified binder includes a binder, a modified binder includes a binder and a multiplicity of the treated plastic particles of the third general aspect. The binder includes a concrete binder or an asphalt binder, and the modified binder includes 5 wt % to 25 wt % of the hybrid-treated plastic particles.

In one implementation of the fourth general aspect, the composition is a concrete composition or an asphalt composition.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIGS. 12A and 12B show multiple stress creep recovery for NTPGM, OTPGM, and HTPGM binder samples.

DETAILED DESCRIPTION

Preparing treated plastic granules (TPG) from waste plastic, the resulting treated plastic granules, and compositions including the treated plastic granules are described. In this disclosure, "granules" and "particles" are used interchangeably. The TPG can be used in construction applications, including the concrete and asphalt industry, as a partial replacement for filler, aggregates, and cement. The TPG are compatible for use in asphalt and concrete, and help divert plastic waste from landfill while simultaneously enhancing performance of construction elements. In the concrete industry, for example TPG enhance toughness and reduce shrinkage and cracking, while retaining moisture to improve internal curing. In the asphalt industry, TPG can enhance fatigue life and self-healing capacity of pavements to extend pavement service life.

Figure 1A:
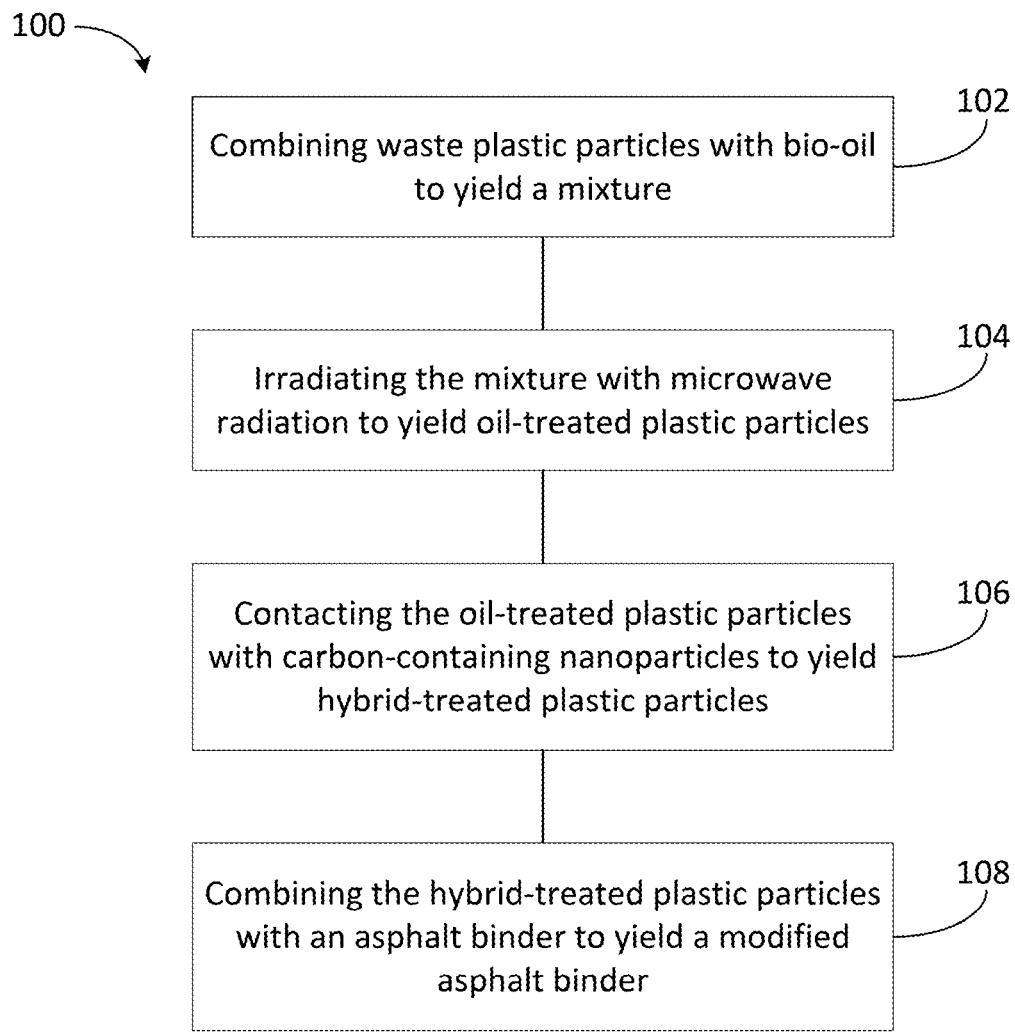
FIG. 1A is a flow chart showing operations in a process to prepare treated plastic granules.

FIG. 1A shows operations in process 100 to prepare hybrid-treated plastic particles. In 102, waste plastic particles are combined with bio-oil to yield a mixture. The waste plastic particles are typically mixed waste plastics, and can include a mixture of two or more of polyethylene (PE), polyethylene terephthalate (PET), polypropylene (PP), polystyrene (PS), and polyvinyl chloride (PVC). In one example, the waste plastic particles include PET (e.g., mixed color PET). A size of the plastic particles can vary based on whether the intended application is a wet or dry process (e.g., added to the binder or the mineral aggregate of the mixture. As used herein, "bio-oil" generally refers an oil derived from pyrolysis of biomass. Examples of bio-oil include oil derived from waste vegetable oil, algal oil, and other oils extracted from biomass waste. In some cases, the waste plastic particles and the bio-oil are combined in a mass ratio of 2:1 to 1:2 (e.g., about 1:1). The mixture can be allowed to age (e.g., from about 1 hour to about 24 hour) under ambient conditions. In one example, the mixture is allowed to age (or condition) for about 12 hours under ambient conditions.

In 104, the mixture is irradiated with microwave radiation to modify a surface of the waste plastic particles, thereby "bio-modifying" the surface (e.g., grafting bio-oil molecules on to the surface). Biomodification of the surface of the waste plastic particles increases their surface energy and interactions with the matrix. As described herein, "interactions" generally refer to weak or strong bonding interactions (e.g., hydrogen bonds or covalent bonds). Bio-modification can be confirmed by the appearance of an increased peak at 2800–3000 $cm^{-1}$ in an FTIR spectrum associated with oil compounds and increased crystallinity in the treated plastic.

A power of the microwave radiation is typically in a range of about 300 W to about 500 W (e.g., 400 W). The mixture can be irradiated for a length of time in a range from about 1 minute to about 60 minutes. The mixture is typically agitated (e.g., stirred) after irradiation. In some cases, the irradiation occurs in more than one step, with the first irradiation step followed by cooling (e.g., at ambient conditions). The oil-treated plastic particles can be reduced in size (e.g., ground), washed (e.g., in a solvent, such as acetone), and dried (e.g., in an oven). In certain cases, the oil-treated plastic particles are sieved to yield a multiplicity of particles having a size within a selected range (e.g., in a range of 250 μm to 750 μm, or 400 μm to 600 μm).

In 106, the oil-treated plastic particles are contacted (e.g., coated or partially coated) with carbon-containing nanoparticles to yield hybrid-treated plastic particles. Suitable carbon-containing nanoparticles include graphene nanoparticles or nanoplatelets, carbonacesou particles made from biomass such as biochar, and the like. Contacting the oil-treated plastic particles can include preparing a solution of the carbon-containing nanoparticles. Preparing the solution can include dispersing carbon-containing nanoparticles in a solvent (e.g., an aqueous solution of acetone) by agitation (e.g., sonication). The oil-treated plastic particles are combined with the solution and further agitated to coat the oil-treated plastic particles with the carbon-containing nanoparticles, thereby yielding the hybrid-treated plastic particles. In one example, coating the oil-treated plastic particles comprises physisorbing the carbon-containing nanoparticles on the oil-treated nanoparticles. The hybrid-treated plastic particles are dried (e.g., in an oven). A thickness of the carbon-containing nanoparticles on the oil-coated plastic particles is typically in a range of about 1 nm to about 20 nm (e.g., 5 nm to 10 nm).

Figure 1B:
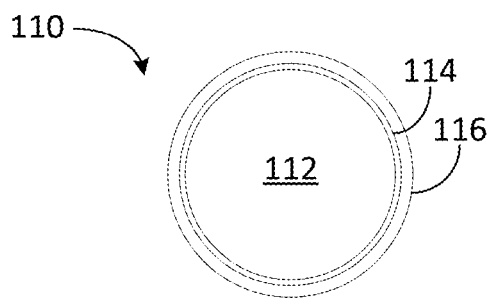
FIG. 1B depicts a treated plastic granule.

FIG. 1B depicts hybrid-treated plastic particle 110. Hybrid-treated plastic particle 110 includes plastic particle 112. A surface of plastic particle 112 is modified with bio-oil 114. Hybrid-treated plastic particle 110 includes a coating or partial coating of carbon-containing nanoparticles 116. Hybrid treatment on plastic granules is shown reduce their surface resistivity. The resistivity of non-treated plastic is typically greater than $10^8$ kΩ/sq. In an example with graphene nanoparticles, the resistivity gradually decreases with increased physisorption of graphene nanoparticles onto the surface of plastics as sonication progresses, with the resistivity reaching a plateau of $1\times10^{-6}$ kΩ/sq. In one example, the surface energy of the treated plastics is 49% higher than that of non-treated plastics.

Preparing a modified binder includes combining a multiplicity of hybrid-treated plastic particles 110 with a binder to yield a modified binder. The modified binder can be a concrete binder or an asphalt binder. That is, a concrete or asphalt composition can include a modified binder.

Examples of suitable concrete binders include cementitious materials, hydraulic cement, quick lime, and hydraulic lime. Examples of suitable asphalt binders include bituminous binders and petroleum-based thermoplastics adhesives. In some cases, the modified binder includes 5 wt % to 25 wt % of the hybrid-treated plastic particles and 75 wt % to 95 wt % of the binder. In certain cases, the modified binder includes 10 wt % to 20 wt % of the hybrid-treated plastic particles and 80 wt % to 90 wt % of the binder. The hybrid-treated plastic particles enhance intermolecular interaction and healing capacity by promoting interfacial adhesion at the stone-binder interface. Binder modification with hybrid-treated plastic particles can result in a decreased separation tendency (e.g., from 132% in binder containing non-treated plastics to 25% in binder containing hybrid-treated plastics). The softening point difference can be reduced from 8.5° C. in non-treated plastics to 4.25° C. in hybrid-treated plastics. This reduction in separation and softening point difference can be attributed to enhanced compatibility of plastics and binder. In some cases, binders containing hybrid-treated plastics have a higher resistance to fatigue cracking than a binder with non-treated plastics.

In one example, the capacity for stress release at sub-zero temperatures was found to be highest for binders containing hybrid-treated plastics, followed by binders with oil-treated plastics, then binders having non-treated plastics. In another example, as measured by the moisture-induced shear-thinning index (MISTI), binders containing oil-treated plastic granules were the least susceptible to moisture, followed by binders containing hybrid-treated plastic granules, and binders containing non-treated plastic granules.

EXAMPLES

Materials

Waste-plastic flakes made mainly from polyethyleneterephthalate were donated by Envision Plastics. The asphalt binder used in this study is PG 64-22 from Holy Frontier Corporation in Arizona (Table 1). The bio-oil is derived from Waste Vegetable Oil using a fast pyrolysis method. Graphene nanoparticles (grade Nano 24) were acquired from Asbury Carbons. Modified asphalt binder was prepared by mixing 15% (by weight) plastic granules into 85% (by weight) asphalt binder at 155° C. for 30 minutes. In addition to the control asphalt binder (without plastic granules), three modified asphalt specimens were prepared for testing: 1) non-treated plastic granules (NTPG); 2) oil-treated plastic granules (OTPG); and 3) hybrid-treated plastic granules (HTPG).

TABLE 1

General properties of the PG64-22 asphalt binder

| | |
|---|---|
| Specific Gravity @15.6° C. | 1.041 |
| Cleveland Open Cup method flash point | 335 ° C. |
| Mass change after RTFO | −0.013 |
| Absolute Viscosity @ 60° C. | 179 Pa · s |
| Stiffness @−12° C. @ 60 s | 71.67 MPa |

Sample Preparation Methods

Oil-Treated Plastic Granules (OTPG). Plastic granules and bio-oil were mixed thoroughly at 1:1 ratio by mass in a 250 ml beaker followed by a 12-hour conditioning time. The preconditioned mixture was radiated by microwave for a total of 8 minutes at 400 W. The microwave radiation was done in two steps. After 4 minutes of microwave radiation, the mixture was removed and thoroughly stirred for ten minutes before it was placed back in the microwave oven for another 4 minutes. After the radiation, the beaker containing the mixture was removed and the content was thoroughly mixed and left to cool for 20 minutes. The mixture was then ground and washed using acetone, this was followed by drying in an oven for 15 min at 600° C. The mixture was then sieved using sieve numbers 30 and 50. Particles passing sieve #30 and retained on sieve #50 were collected and stored for application. These particles are referred to as OTPG.

Hybrid-Treated Plastic Granules (HTPG). To prepare the hybrid-treated plastic granules, oil-treated plastic granules (OTPG) were coated with graphene nanoplatelets (an average thickness of 7 nm). The first step in the coating was to prepare solutions of 40 wt % acetone and 60 wt % distilled water. Then, graphene nanoplatelets with the quantity equal to 1.0 wt % of OTPG mass was added to the solution and sonicated (Branson 3510, 40 kHz, 130 W) for 15 minutes. Once the sonication was completed, samples were added to the solutions and sonicated for another 2 hours. The solution was then removed from the container and coated samples were dried in an oven at 100° C. for a duration of 1 hour. This sample is referred to as HTPG.

Test Methods

Electrical Resistivity. A Keithley 2400 power/source meter was used to measure electrical resistivity of plastics granules. The 4-point probing setup consists of 3 key components. Probing Station. Source Meter. Pro-4 Software. The 4-point probing setup can measure resistivity or the thickness of a film.

Attenuated Total Reflectance Fourier Transform Infrared Spectroscopy (ATR-FTIR). A Bruker FT-IR Spectrometer situated in the Eyring Materials Center at Arizona State University was used in absorbance mode to detect biomolecules absorbed onto the plastic surface; a diamond ATR was used with mid-infrared range to detect grafting of biomolecules. Wavenumbers ranging from 4000 cm-1 to 400 cm-1 were covered. Analysis of spectra was carried out in Origin software.

Attenuated Total Reflectance Fourier Transform Infrared Spectroscopy (ATR-FTIR). For ATR analysis, a built-in ATR with diamond crystal was used in a Thermo Fisher Nicolet iS50 equipped with DTGS detector. Individual particles were placed on the ATR crystal to completely cover the 1 mm crystal surface. Uniform pressure was applied on all samples using the built-in pressure clamp. Scan parameters used were 128 scans and a resolution of 4 cm$^{-1}$. Analysis of spectra was carried out with OMNIC software.

Fourier Transform Raman spectroscopy (FT-Raman). A Thermo Fisher Nicolet iS50 FT-IR spectrometer equipped with a calcium fluoride beam splitter and an FT-Raman module was used for all analyses. FT-Raman uses a long-wavelength laser (1064 nm), which reduces fluorescence from dyes and produces high signal-to-noise spectra. A total of 256 scans were co-added for each spectrum at 8 cm$^{-1}$ resolution. Sampling area per particle was approximately 50 µm with a laser voltage of 0.5 W. Each sample was analyzed at multiple spots for repeatability.

Rotational viscosity. A Brookfield rotational viscometer, DVII-Ultra, was used to measure the viscosity of the binder at the high temperature following (ASTM-D-4402, 2015). A continuous shear was used with a smooth spindle (SC4-27) for 10 minutes to measure viscosity. Measurements were done at four temperatures (105° C., 120° C., 135° C., 150° C.) at a shearing speed of 20 rpm.

Phase Separation Study. A storage stability test, also known as a cigar-tube test, was adopted following the standard ASTM D7173-14. About 50 g of modified binder was taken into an aluminum tube and kept in vertical position for 48 hours at 163° C. in an oven. After the 48 hours passed, the tubes were immediately placed in a refrigerator at −18° C. for at least 4 hours. After 4 hours passed, while the sample was still stiff, it was cut into approximate top, bottom, and middle portions. Two methods were used to evaluate the phase separation of the samples. The first method uses a phase separation indexing by measuring the complex modulus and phase angle of the top and bottom sections of the aluminum tubes using a dynamic shear rheometer (DSR) at 10 rad/sec at 58° C. The second method measures the difference between the ring and ball softening points of the top and bottom sections of the cigar tube.

The first method of evaluating the phase separation calculates a separation index using the following equation:

$$SI = \frac{\left(\frac{G^*}{\sin\delta}\right)_{max} - \left(\frac{G^*}{\sin\delta}\right)_{avg}}{\left(\frac{G^*}{\sin\delta}\right)_{avg}}$$

where:

$(G^*/\sin\delta)_{max}$ = the higher of the values for the top and bottom sections of the aluminum tube $(G^*/\sin\delta)_{avg}$ = the average value of both sections The second method of evaluating the phase separation was determined through the difference in softening point. The softening point is a temperature at which a bituminous sample fails to support the weight of a 3.5-g steel ball. Widely used in Europe and Asia, this method can be used to compare the top and bottom parts of a cigar-tube test. To perform this test, two horizontal disks of poured binder supporting two steel balls in brass rings are heated at a controlled rate in a liquid bath. The softening point is reported as the mean of the temperatures at which the steel balls are allowed to fall a distance of 25 mm (1.0 inch) (ASTM-D36, 2014).

Dynamic Shear Rheometer (DSR). An Anton-Paar dynamic shear rheometer was used following the standard (ASTMD7175–15, 2015) to determine the elastic and viscous behavior of all samples. Measurements of complex shear modulus (G*) and phase angle (δ) were taken in a temperature range of 22° C. to 64° C. at a 6-degree interval. For this study, an 8-mm spindle was used. The complex shear modulus and phase angle were calculated from the measured data using Equation 2. The complex shear modulus (G*) is a measure of material resistance to deformation when repeatedly sheared, and δ, the time lag between stress and strain, is used to evaluate pavement rutting and fatigue-cracking resistance (AASHTOT315, 2012).

$$G^* = \frac{\tau_{max}}{\gamma_{max}} \tag{2}$$

in which $\gamma_{max} = \left(\frac{\theta r}{h}\right)$ and $\tau_{max} = \frac{2T}{\pi r^3}$ where:

$\gamma_{max}$ = maximum strain $\tau_{max}$ = maximum stress $T$ = applied maximum torque $r$ = sample radius $\theta$ = deflection (rotational) angle $h$ = sample height Based on the performance grade specifications (ASTMD6373-13, 2013), the data obtained were evaluated using G*/sin(δ) at 64° C. for rutting behavior. For fatigue resistance, G*sin(δ) at 46° C. was evaluated. In addition, master curves at 52° C. were generated for all samples using time-temperature superposition shifting of the complex modulus and phase angle data to the reference temperature of 52° C.

Delta $T_c$ using a Bending Beam Rheometer. The bending beam rheometer (BBR) test is a three-point bending test that measures deflection (d) over time by applying a load of 980±50 mN for the duration of 240 s at the midpoint of the beam. Prior to testing, a beam of fixed length, width, and height was prepared and was immersed in a cold bath of ethanol. Then flexural creep stiffness (S) and stress relaxation capacity (m-value) were calculated following the Superpave™ specification (AASHTO-T-313, 2019). For this experiment, the BBR was performed at two different low temperatures, to determine the change in critical temperature $\Delta T_c$. The critical temperature ($T_c$) is the temperature at which the specification limits of stiffness and stress relaxation exactly match. $T_{c,S}$ is the critical stiffness temperature, where the stiffness at 60 seconds loading, S(60), is 300 MPa. $T_{c,m}$ is the critical relaxation temperature, where the m-value at 60 seconds loading, m(60), is 0.300. Formulas for determining $T_c$ for S (60) and m(60) are provided below.

$$T_c = T_1 + \left[\frac{\text{Log}(300) - \text{Log}(S_1)}{\text{Log}(S_1) - \text{Log}(S_2)} \times (T_1 - T_2)\right] - 10 \tag{3}$$

$$T_c = T_1 + \left[\frac{0.3 - m_1}{m_1 - m_2} \times (T_1 - T_2)\right] - 10 \quad (4)$$

where:

$T_1$ = sub-zero Temperature #1, (°C.)

$T_2$ = sub-zero Temperature #2, (°C.)

$S_1$ = Stiffness at 60 seconds loading at Temperature #1, MPa $S_2$ = Stiffness at 60 seconds loading at Temperature #2, MPa $m_1$ = m-value at 60 seconds loading at Temperature #1

$m_2$ = m-value at 60 seconds loading at Temperature #2

Moisture Induced Shear-Thinning Index (MISTI). To obtain moisture induced shear thinning index the samples were tested using the dynamic shear rheometer using 8 mm spindle. A ramping shear rate of 0.1 to 420 l/s was used to track the change in viscosity of the samples as well as detect the onset of the shear thinning and its slope. Each binder specimen was blended with 50 wt % glass beads (100 microns). Glass beads represent siliceous stones in asphalt matric and used to examine effects of moisture on the interface of bitumen and stone aggregates for ten samples, each weighing 0.30 grams. Five of the samples were tested in dry conditioning and the other five were conditioned in distilled water at 60° C. for 24 hours. Each conditioned sample was surface dried before testing. All tests were performed at 25° C. The average of three replicates were used to determine the MISTI, which is defined as the ratio of thinning slopes of the unconditioned to conditioned samples.

Results

Figure 2:
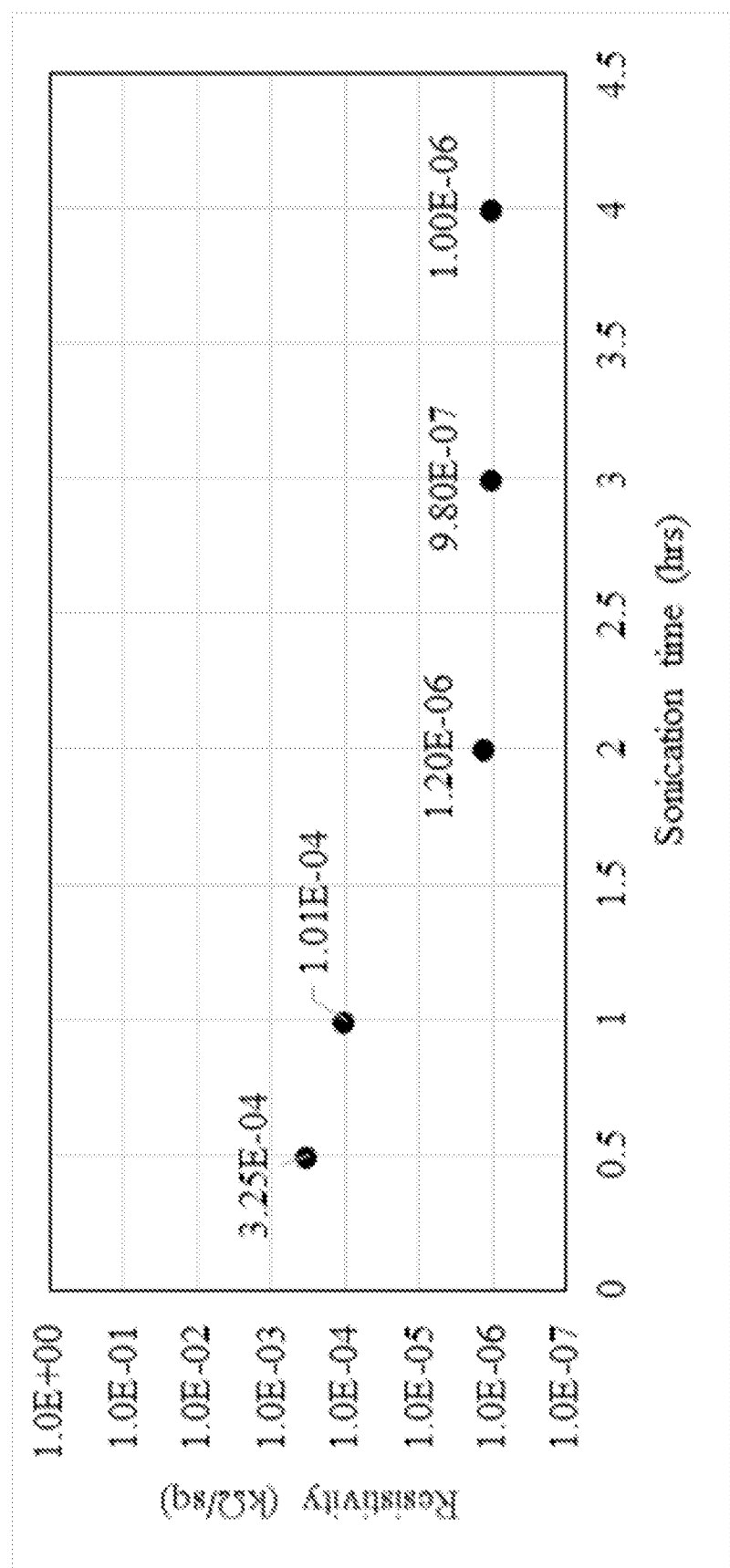
FIG. 2 shows surface resistivity of treated plastic granules (TPG) with respect to sonication time.

Electrical Resistivity. The success of the graphene coating on plastic granules was tested using an electrical resistivity test. The resistance of the samples was measured using four-point probes (Keithley 2400) at ambient temperature, according to the standard (ASTM-D257, 1999). The samples were placed between two copper plates with an area of 16.1 $cm^2$ and measurements were taken after 60 seconds. FIG. 2 shows the surface resistivity of HTPG with respect to the sonication time. The surface resistivity of the oil-treated plastic granules which was over $10^8$ kΩ/sq continuously decreased as graphene coating occurred during the sonication process and reached a plateau at $1\times10^{-6}$ kΩ/sq. This result indicated that as the quantity of conductive graphene nanoparticles adhered to the surface of the OTPG increased, the resistivity decreased.

Figure 3:
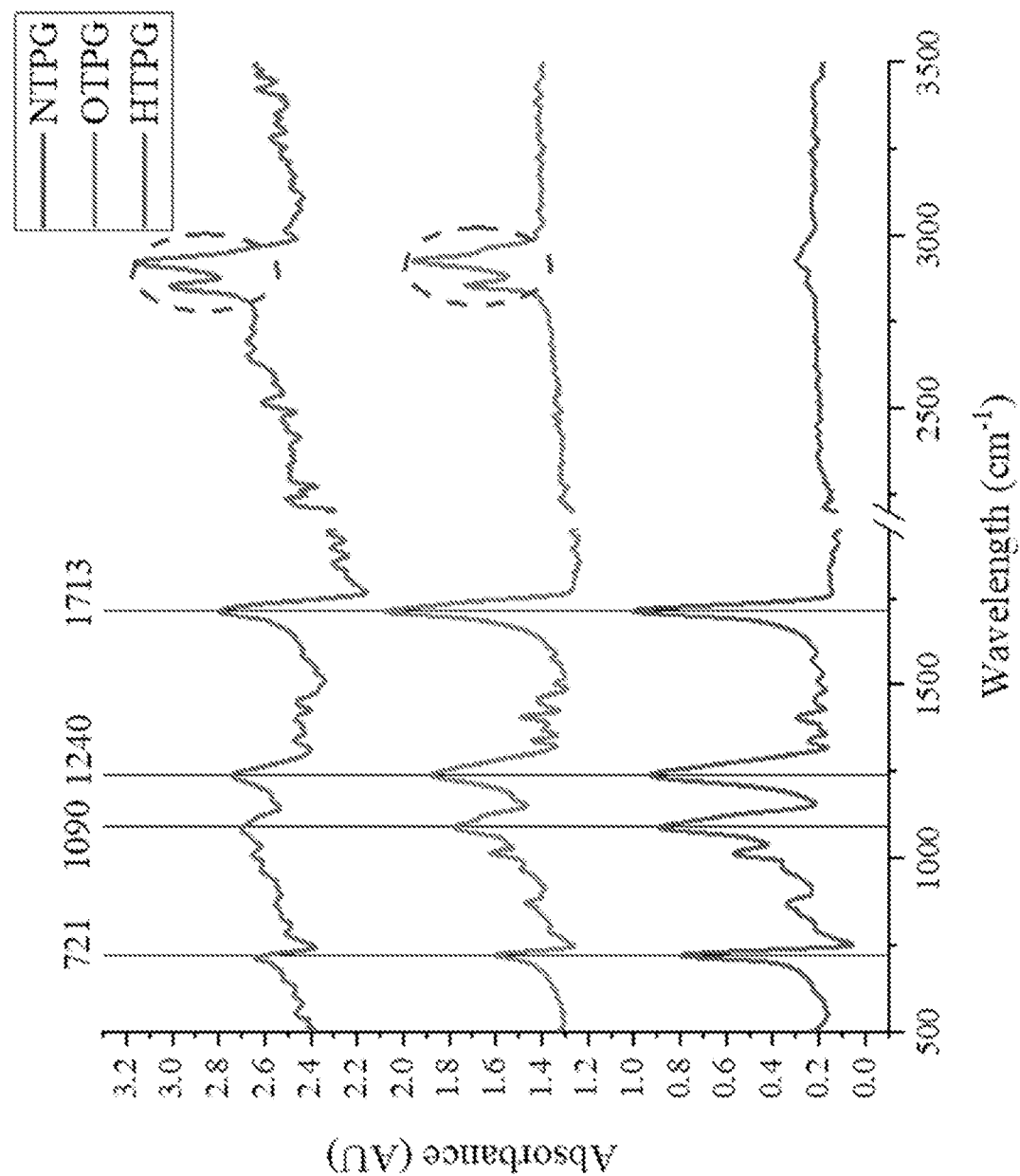
FIG. 3 shows Fourier transform infrared (FTIR) spectra of non-treated plastic granules (NTPG), oil-treated plastic granules (OTPG), and hybrid-treated plastic granules (HTPG).

FTIR-ATR. Characteristic absorbance peaks ($cm^{-1}$) of the samples are shown in Table 2 and FIG. 3. FIG. 3 shows the normalized FTIR spectra of non-treated plastic granules (NTPG) (upper), oil-treated plastic granules (OTPG) (middle), and hybrid-treated plastic granules (HTPG) (lower). NTPG was found to be constituted of waste PETs. There is a reduction in peak intensity in the fingerprint regions between 721-1713 $cm^{-1}$ of both OTPG and HTPG, indicating the efficacy of hybrid treatment on plastic granules. Also, the 3-band stretching near the 2850-3000 $cm^{-1}$ associated to C—H stretching in the backbone structure is more prominent in OTPG and HTPG. This sharp change is probably due to the increased crystallinity in treated plastic granules. This can be an indication of the efficacy of the treatment, as changes must have occurred in the backbone structures of plastics.

TABLE 2

FTIR characteristic peaks found in PET samples

| Source | Ar. C—H out of plane bend | Ar. C—H in plane bend | C—O Stretch | C—O Stretch | C=O Stretch | C—H Stretch |
|---|---|---|---|---|---|---|
| NTPG | 721 | 1016 | 1090 | 1241 | 1713 | 2923 |

Figure 4A:
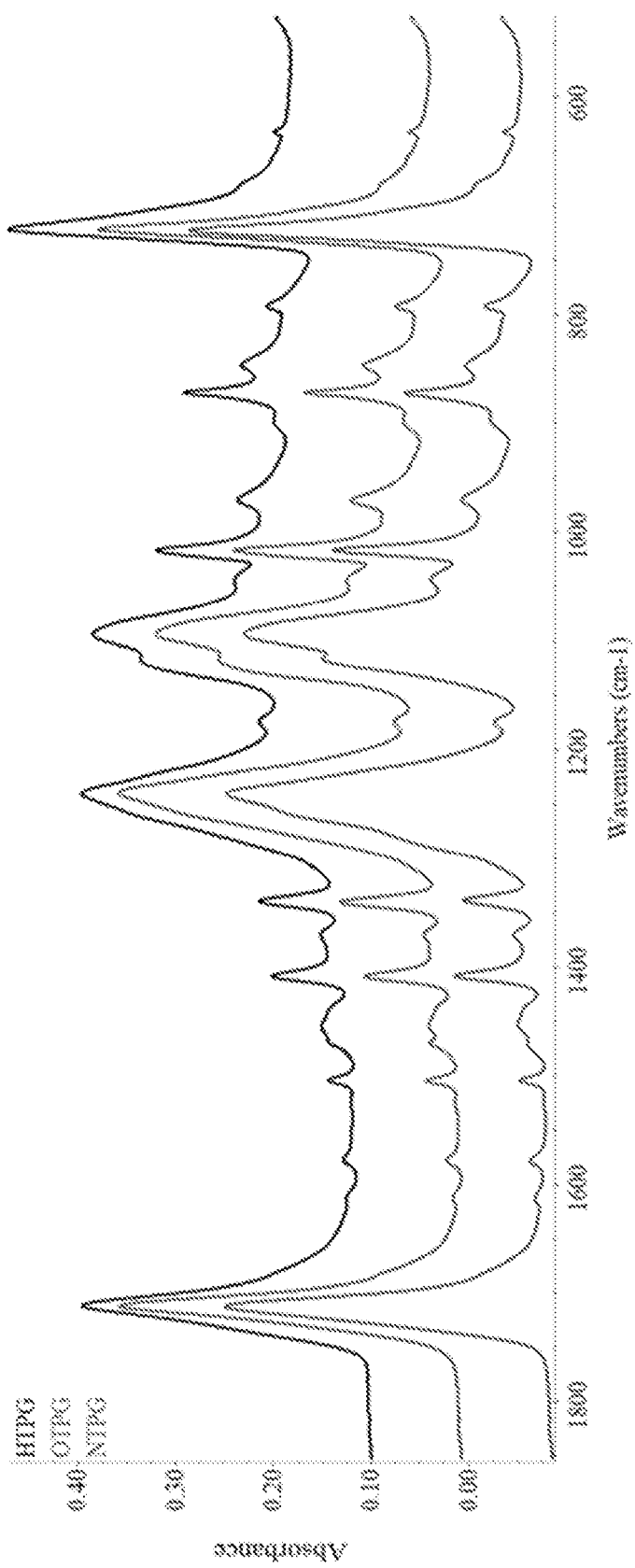
FIGS. 4A and 4B show attenuated total reflectance Fourier transform infrared (ATR-FTIR) spectra of the fingerprint region and CH region, respectively, of NTPG, OTPG, and HTPG.
Figure 4B:
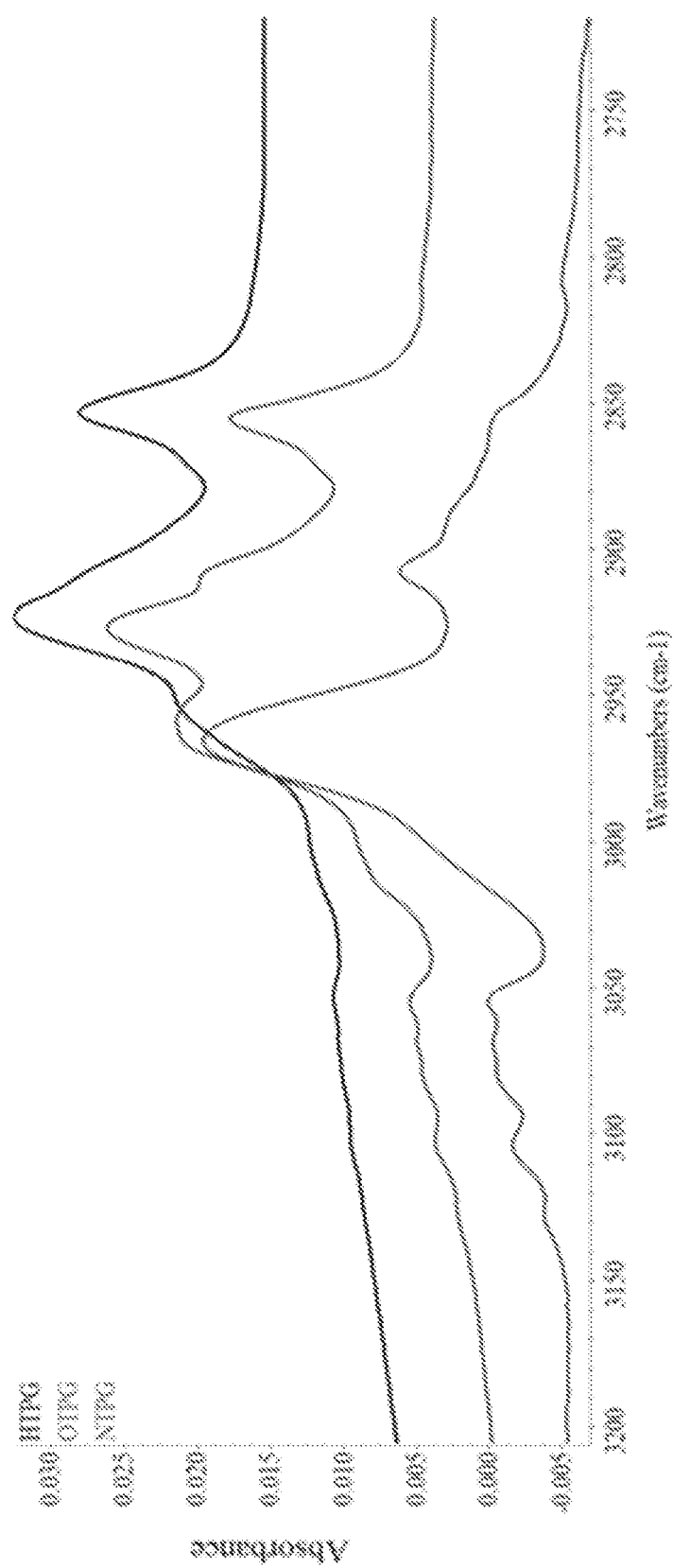

Raman/IR spectroscopy. Raman spectroscopy/ATR-FTIR was used to further analyze the efficacy of the treatment on plastic granules. FIGS. 4A and 4B how the fingerprint and CH regions for NTPG (lower), OTPG (middle), and HTPG (upper). In the fingerprint region, characteristic features expected from a PET polymer are clearly seen. In the fingerprint region, only small variations are observed in the 1450 $cm^-$ region. Regarding changes observed in 3000-2800 region, FIG. 4B indicates major differences between the untreated and treated samples in the CH region for NTPG (lower), OTPG (middle), and HTPG (upper). Peak assignments for the peaks in the fingerprint region as well as the CH region are provided in Table 2. There are minimum differences in the fingerprint region and major differences in the CH stretch region; this indicates that the backbone of the molecule has undergone significant change in its orientation. In general, variation in the CH stretch region indicates changes in polymer orientation or crystallinity. As the samples analyzed are endpoint reaction analysis, emphasis is given to peak shifts and not peak intensity, since differences in peak intensity in this case could be a result of differences in the contact of a sample with the diamond crystal.

Data shown is from bulk sampling, where multiple particles are being analyzed at the same time; hence the spectral results are an average of these samples. To ascertain whether individual particles show the same kind of differences, particles were segregated based on color for treated and untreated samples. It was found out that irrespective of pigmentation, individual particles showed similar differences.

Figure 5A:
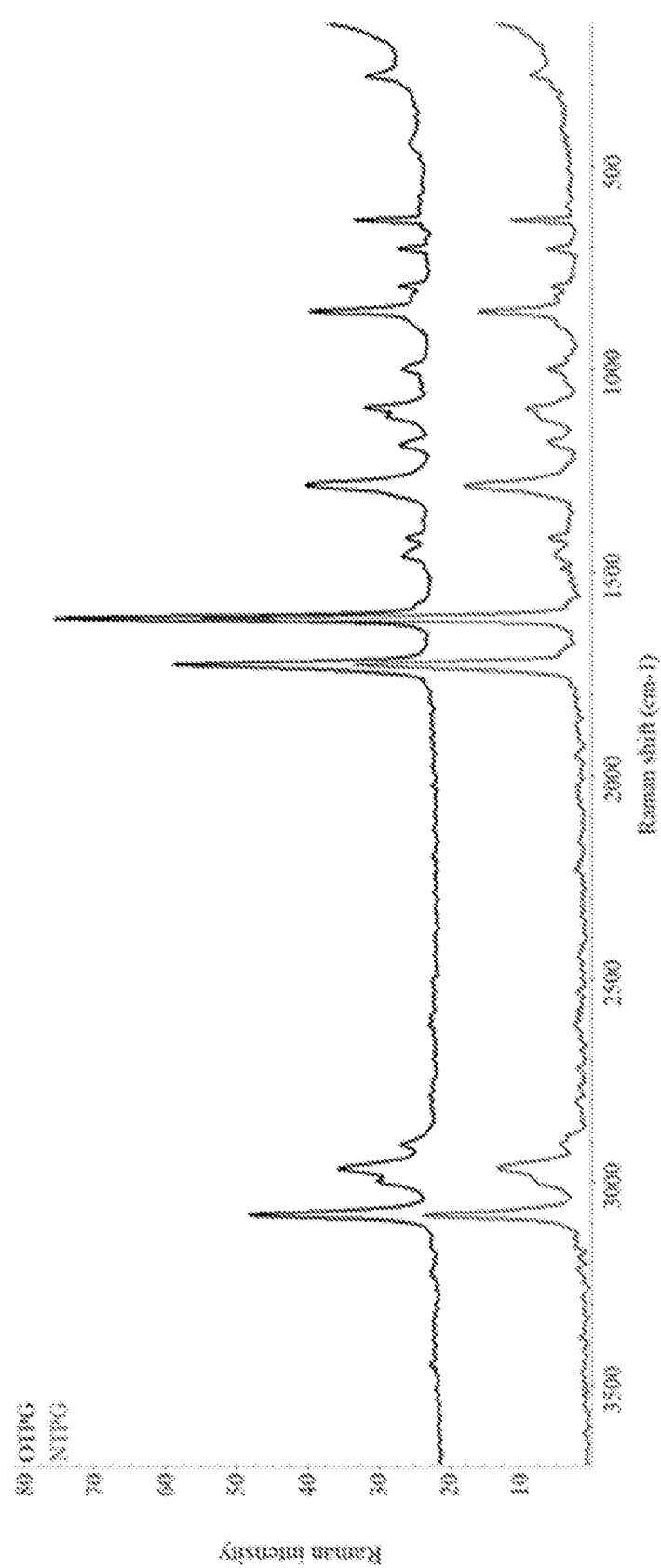
FIG. 5A shows Fourier transform-Raman (FT-Raman) spectra of NTPG and OTPG samples.
Figure 5B:
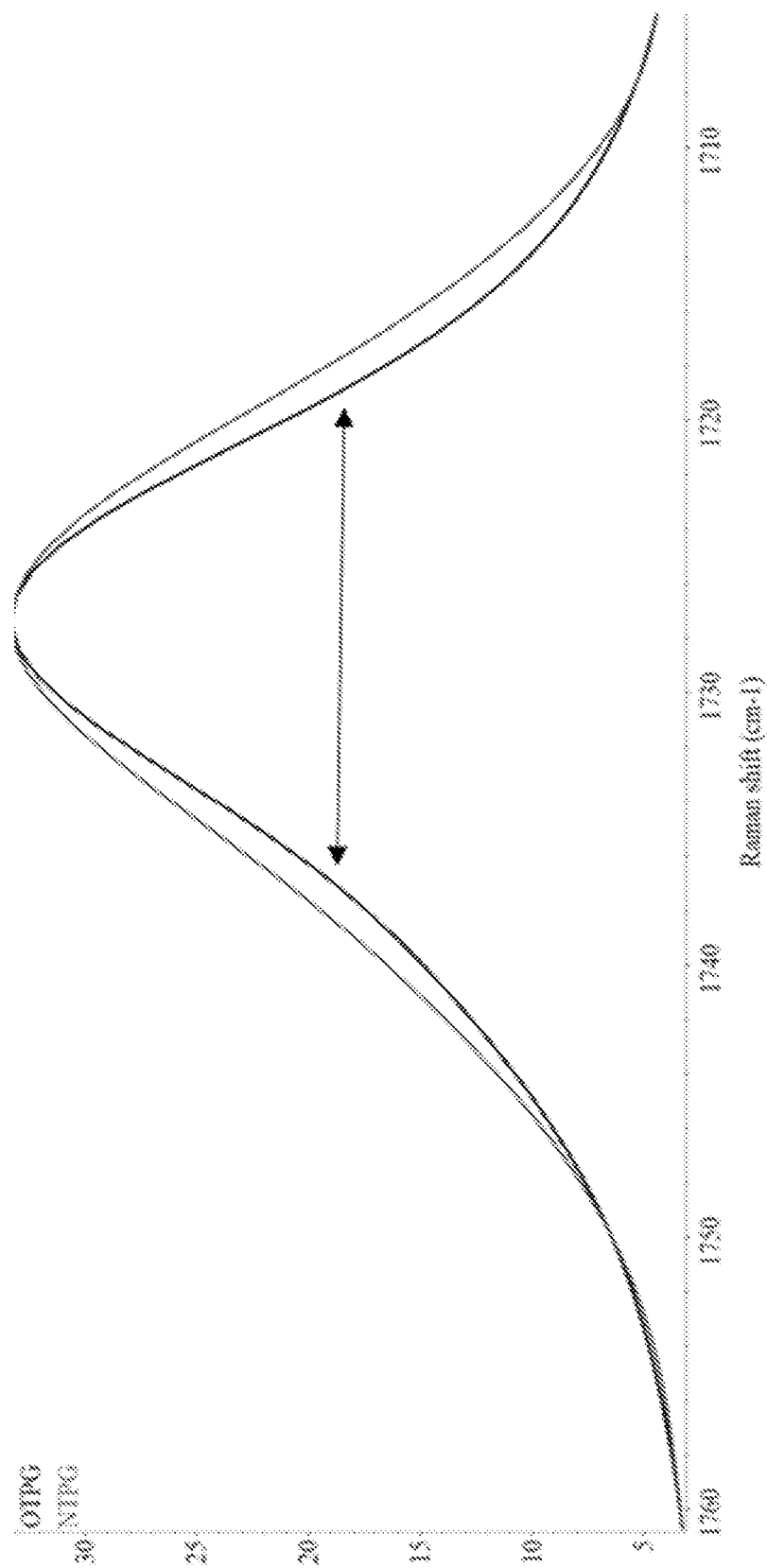
FIG. 5B shows a peak comparison of NTPG and OTPG samples at 1730 $cm^{-1}$.
Figure 5C:
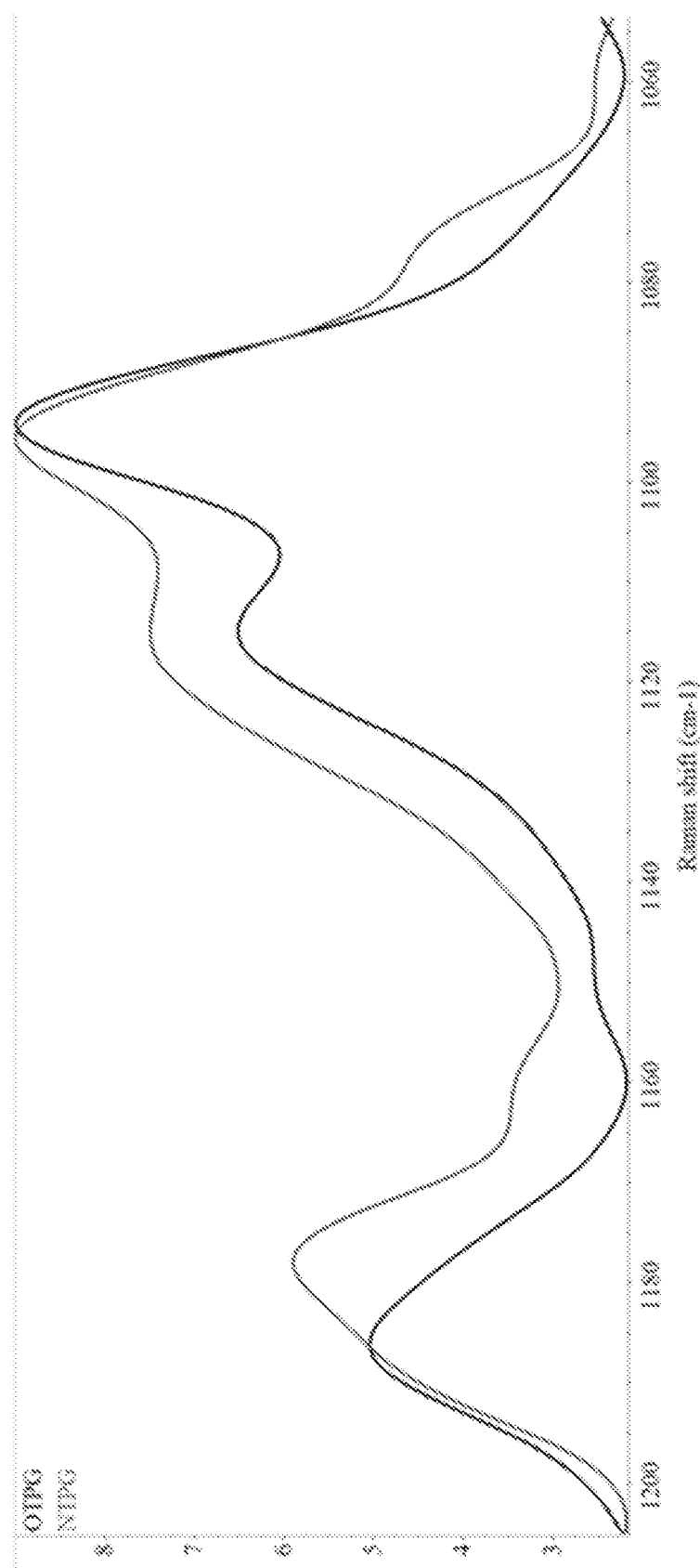
FIG. 5C shows a peak comparison NTPG and OTPG samples between 1200 $cm^{-1}$ and 1060 $cm^{-1}$.

To further evaluate if the crystallinity changes observed with FTIR can be further validated, FT-Raman spectroscopy was also carried out. Highly crystalline samples typically exhibit a large peak at 1,095 $cm^{-1}$, whereas amorphous samples typically show a shoulder/smaller peak on the 1,120 $cm^{-1}$ peak. Highly crystalline samples also typically give a narrow 1730 $cm^{-1}$ peak, whereas the amorphous bandwidth is typically broader. In order to study these characteristics in NTPG and OTPG samples, FT-Raman analysis was carried out. FIG. 5A shows the FT-Raman Spectra from NTPG (lower) and OTPG (upper) samples. FIG. 5B shows a broader peak in NTPG (upper) in comparison to OTPG (lower). FWHM (full width at half maximum) is 18 for OTPG and 21 for NTPG, which clearly shows a peak narrowing of 3 $cm^{-1}$ in OTPG. FIG. 5C shows the region between 1200 and 1060 wavenumbers. The NTPG spectrum (upper) show peaks at 1095, 1115 and 1178 $cm^{-1}$, respectively, whereas the OTPG spectrum (lower) show peaks at 1094, 1115 and 1186 $cm^{-1}$. The ratio of the 1095 peak to the 1115 peak is 1.3 for NTPG and 1.6 for OTPG. Both the shift in the 1094 peak as well the change in the ratio of peaks are in line with the OTPG being more crystalline. The HTPG sample was not used for this analysis, as it is known that a 1064 laser causes heating and burning of materials covered with dark/black-colored graphene. Evaluating the key characteristics exhibited by the NTPG and OTPG samples, it is evident that the treatment of the NTPG samples led to an increase in the crystallinity of the material in the OTPG samples.

Surface energy measurement. Inverse gas chromatography results were obtained for non-treated plastic granules (NTPG) and oil-treated plastic granules (OTPG). The results demonstrated that the total surface energy of oil-treated plastic improved by 49% due to surface treatment, although the acid-base part of surface energy decreased by 10.5%. The increase in surface energy profile at 0.12 n/nm indicates the efficacy of the treatment. The dispersive component for NTPG was found to be 91.86 mJ/m$^2$; the oil treatment in OTPG increased the dispersive component by 55.5% to 142.83 mJ/m$^2$ (Table 3). The amount of increase in total surface energy can contribute to enhanced interaction with asphalt binder molecules and reduced phase separation between plastic granules and the binder matrix.

TABLE 3

Surface energy (mJ/m$^2$) of non-treated and oil-treated plastic granules at 0.12 n/nm surface coverage

| Sample | Dispersive | Acid-base | Total Surface Energy |
|---|---|---|---|
| NTPG | 91.86 | 10.97 | 102.83 |
| OTPG | 142.83 | 9.82 | 152.65 |

Figure 6:
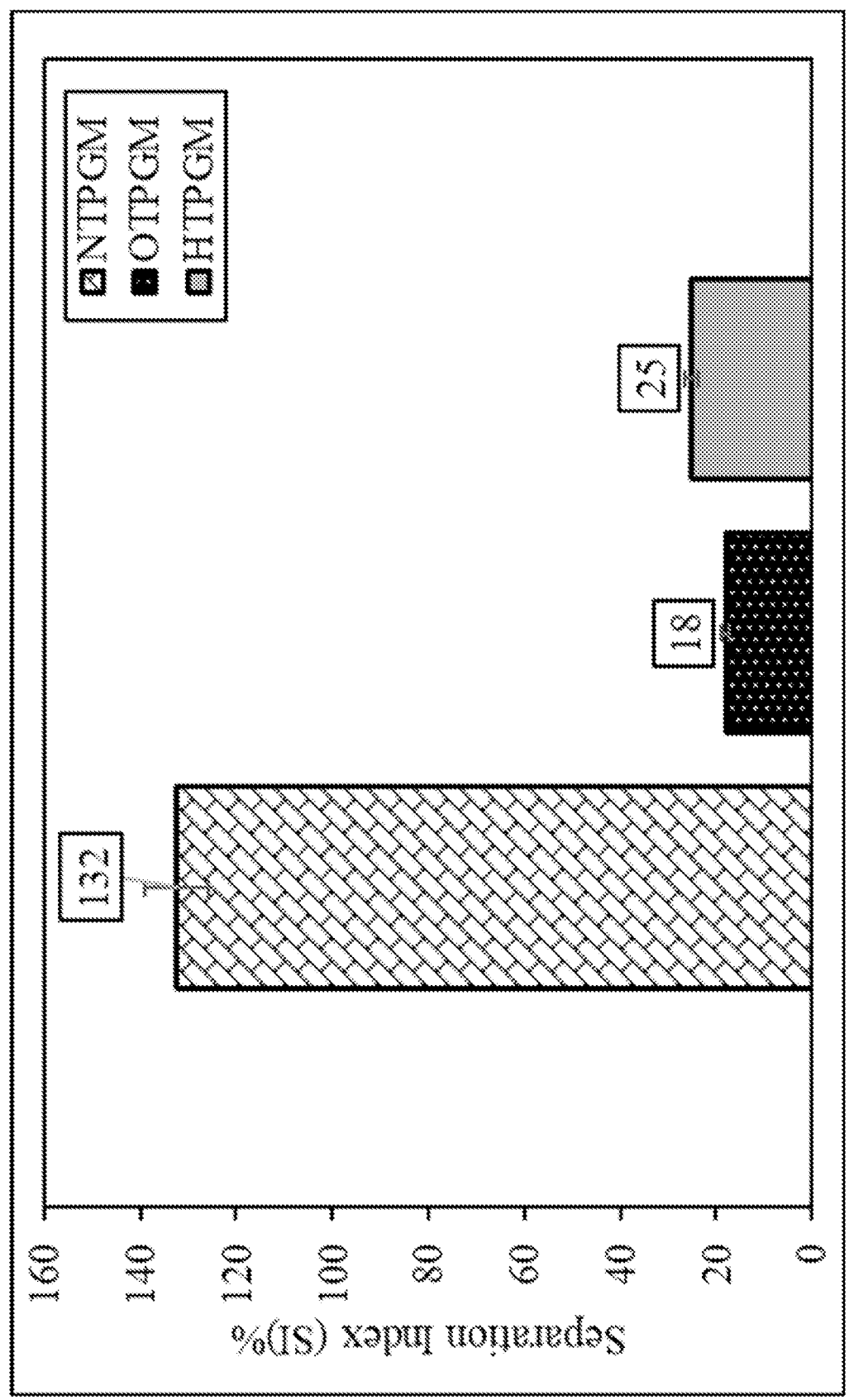
FIG. 6 shows the separation index (SI) for non-treated plastic granules modifier (NTPGM), oil-treated plastic granules modifier (OTPGM), and hybrid-treated plastic granules modifier (HTPGM) binder samples.

Separation Tendency. Using DSR for cigar-tube test samples, a separation index (SI) for treated and untreated modifier samples was calculated and is shown in FIG. 6. The SI for non-plastic granules modifier (NTPGM) is 132% (left); the SI for oil-treated plastic granules modifier (OTPGM) has been reduced to only 18% (middle), which is an 86% reduction in the separation index. Hybrid-treated plastic granules modifier (HTPGM) has an SI index of 25% (right). This indicates the success of treating plastic for use in asphalt binder. There is better absorption and dispersion of plastic granules in the binder matrix with the help of bio-oil; this is also evidenced by the FTIR spectra and the enhancement of surface energy in treated plastic.

Figure 7:
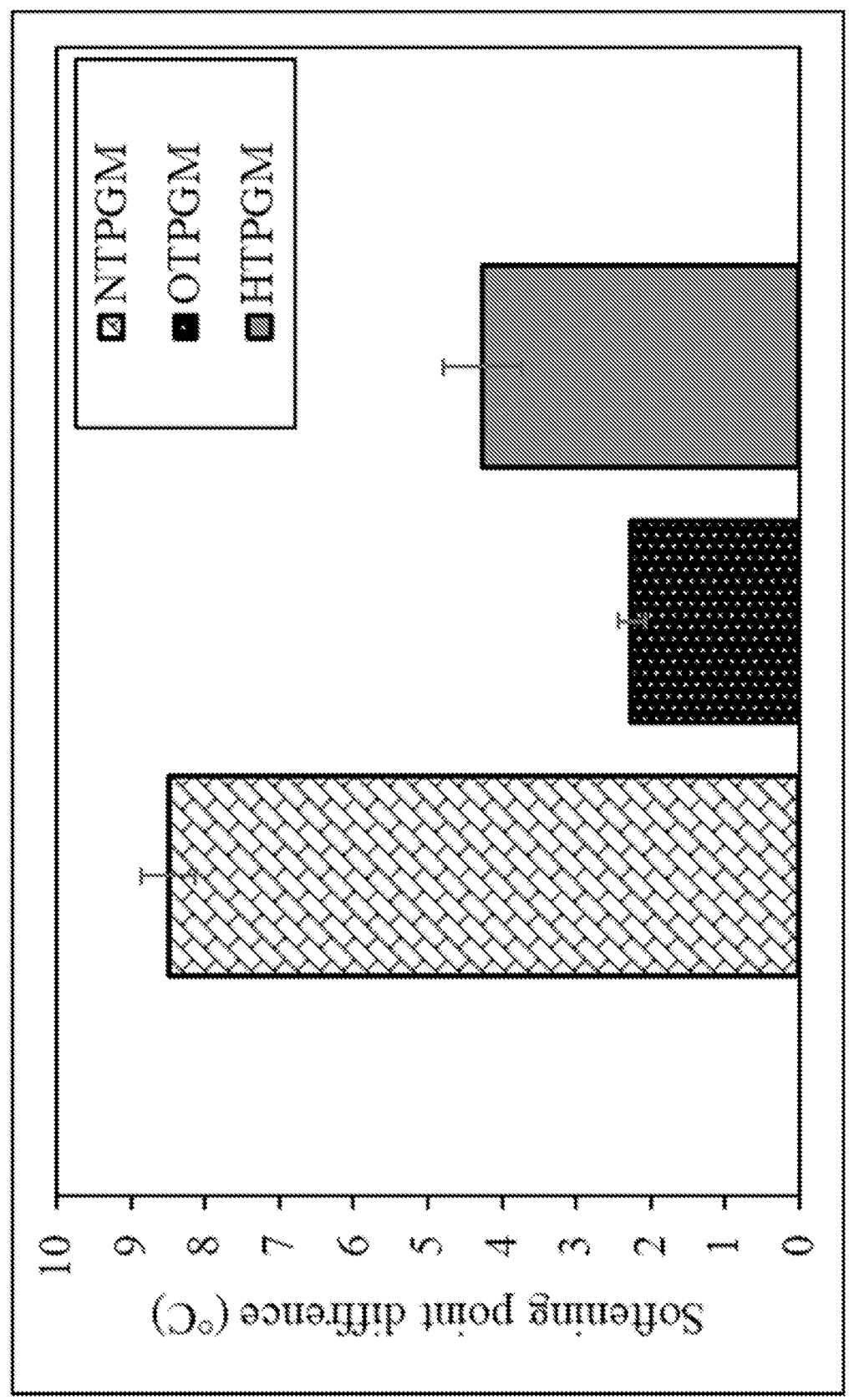
FIG. 7 shows the softening point difference for NTPGM, OTPGM, and HTPGM binder samples.

FIG. 7 shows the softening point difference between the same samples from the cigar-tube test for NTPGM (left), OTPGM (middle), and HTPGM (right). The softening point difference has been significantly reduced to within the 5° C. limit of top and bottom softening point difference. Oil-treated plastic granules modifier (OTPGM) has a softening point difference of only 2.25° C., and Hybrid-treated plastic granules modifier (HTPGM) has a 4.25° C. difference in softening point between top and bottom.

Figure 8:
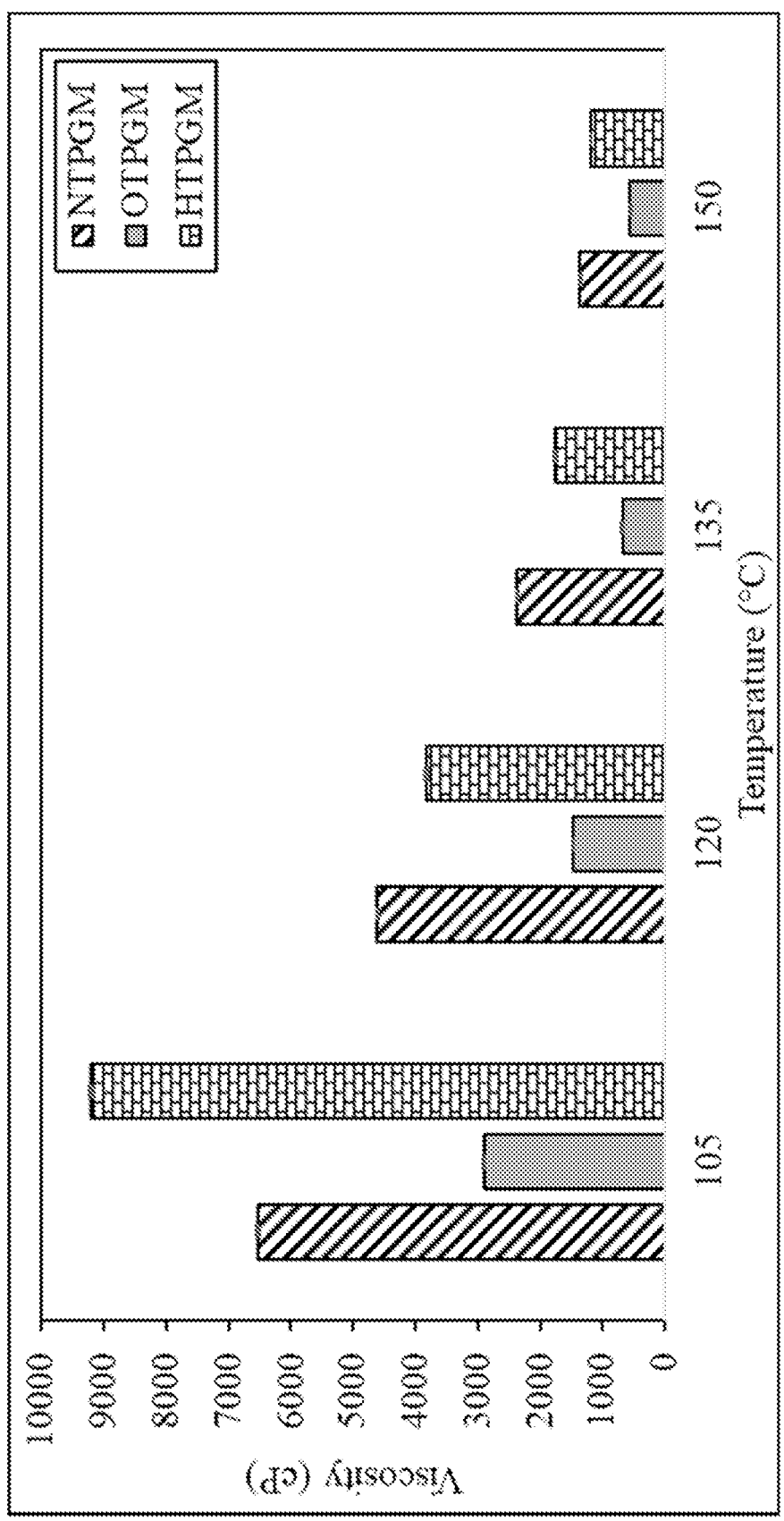
FIG. 8 shows viscosity of NTPGM, OTPGM, and HTPGM binder samples.

Viscosity Measurements. Left, middle, and right bars in FIG. 8 shows the rotational viscosity of non-treated plastic granules modifier (NTPGM), oil-treated plastic granules modifier (OTPGM), and hybrid-treated plastic granules modifier (HTPGM), respectively, at testing temperatures of 105° C., 120° C., 135° C. and 150° C. A reduction in viscosity was observed in the case of treated plastic modifier compared to untreated plastic modifier in all measured temperatures except for hybrid-treated plastic granules modifier (HTPGM) at 105° C. For instance, the viscosity at 135° C. at 20 rpm was reduced by 71% in oil-treated plastic granules modifier (OTPGM) compared to non-treated plastic granules modifier (NTPGM). The decrease in the viscosity of the OTPGM is probably due to degradation of plastics into oligomers and monomers, ensuring it to be sufficiently fluid for pumping and mixing.

Figure 9:
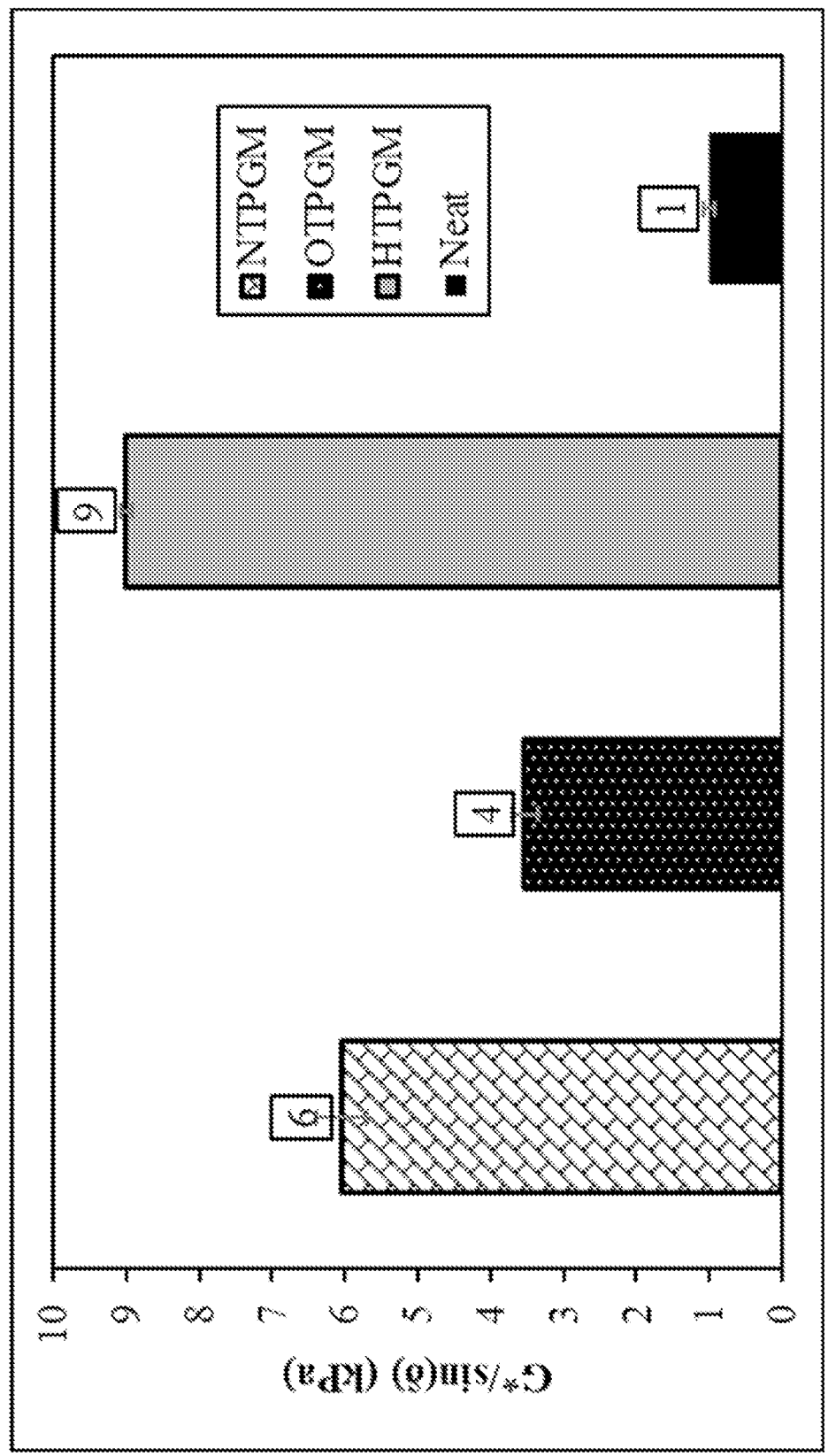
FIG. 9 shows G*/sin (δ) for NTPGM, OTPGM, and HTPGM binder samples at 64° C.

Dynamic Shear Rheometer (DSR). G*/sin(δ) at 64° C. for the neat binder and binders with treated and untreated plastic granules are shown in FIG. 9, with NTPGM, OTPGM, HTPGM, and neat from left to right. It can be seen that the treatment makes all binders stiffer than the neat binder. In oil-treated plastic granules modifier (OTPGM), stiffness decreases by 33% compared to the non-treated plastic granules modifier (NTPGM). On the other hand, hybrid-treated plastic granules modifier (HTPGM) is 50% stiffer than untreated plastic modifier and less susceptible to rutting.

Figure 10:
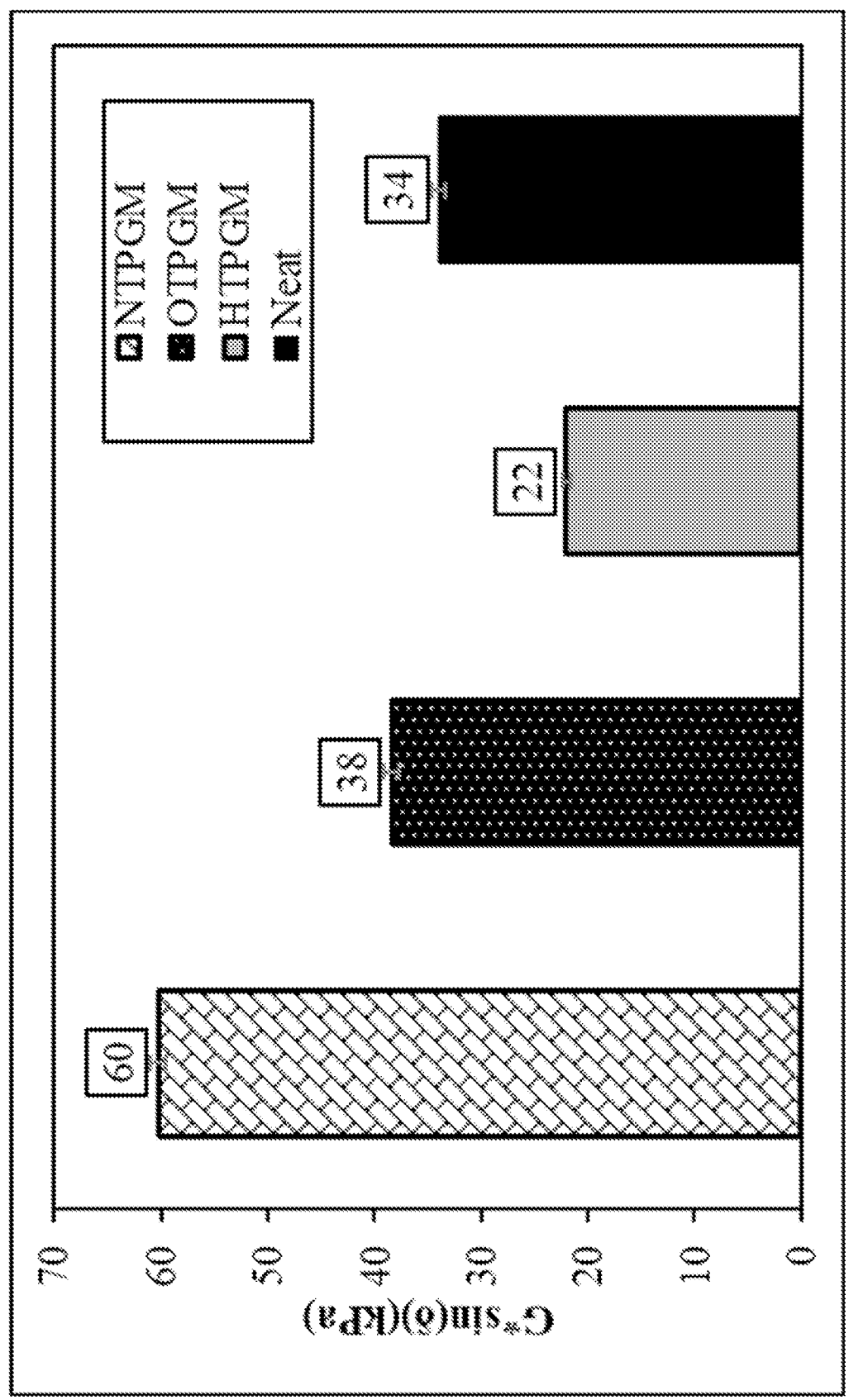
FIG. 10 shows G*/sin (δ) for NTPGM, OTPGM, and HTPGM binder samples at 46° C.

G*sin (δ) at 46° C., for all modified binders and neat binder can be seen in FIG. 10, with NTPGM, OTPGM, HTPGM, and neat from left to right. For fatigue resistance, the binder is preferably not too soft or too stiff. So, a lower value of the G*sin (δ) parameter is typically more desirable. The oil-treated plastic granules modifier (OTPGM) and hybrid-treated plastic granules modifier (HTPGM) reduced the G*sin (δ) value by 35% and 63%, respectively, compared to the non-treated plastic granules modifier (NTPGM). This indicates that the treatment has reduced the fatigue susceptibility of binder modified with plastic granules.

Figure 11:
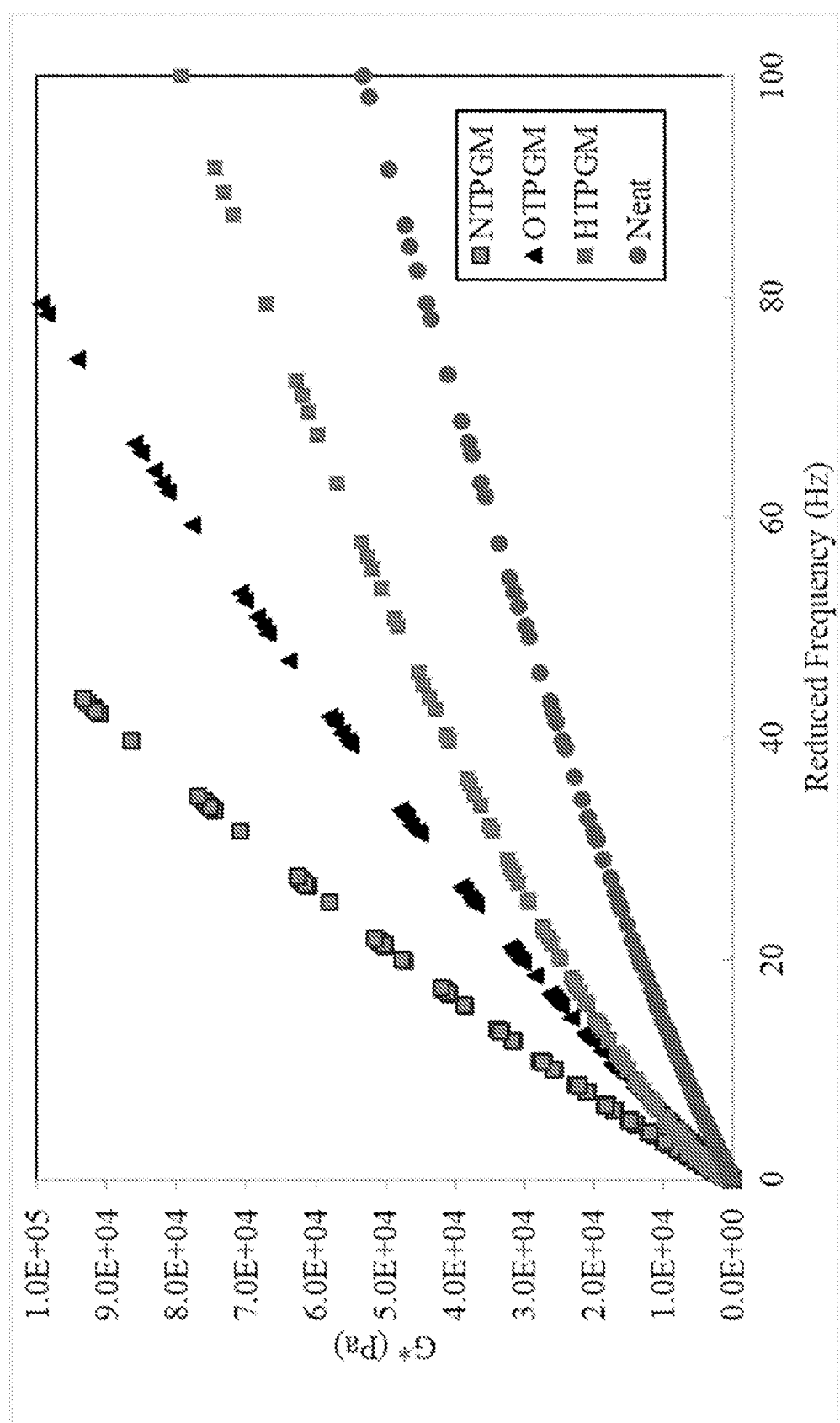
FIG. 11 shows complex shear modulus (G*) master curves for NTPGM, OTPGM, and HTPGM binder samples at 52° C.

The master curves of the treated and untreated plastic-modified binders along with neat binder at 52° C. are shown in FIG. 11, with NTPGM (diamonds), OTPGM (triangles), HTPGM (squares), and neat (circles) from top to bottom. The complex modulus of each treated or untreated plastic-modified binders was comparatively higher than that of the neat binder. The hybrid-treated plastic granules modifier (HTPGM) showed higher stiffness at lower frequencies and lower stiffness at higher frequencies than oil-treated plastic granules modifier (OPTGM), which is more desirable. Non-treated plastic granules modifier (NTPGM) changed the slope more significantly at lower temperatures, whereas oil-treated plastic granules modifier (OTPGM) has a slightly higher change of slope than hybrid-treated plastic granules modifier (HTPGM) at higher temperature.

Multiple Stress Creep Recovery. FIG. 12A shows Jnr values and percentage of recovery at 3.2 kPa obtained through a multiple stress creep recovery test, with NTPGM, OTPGM, and HTPGM from left to right. As shown in FIG. 12B, with NTPGM, OTPGM, and HTPGM from left to right, treated plastic modifier and nontreated plastic modifier respectively have 3.23% and 3.94% recovery, which are almost the same. The $J_{nr}$ values at 3.2 kPa also do not differ very much, except for the hybrid-treated plastic granules modifier (HTPGM). Interestingly, the HTPGM increased the percent recovery by 172% than the non-treated plastic granules modifier (NTPGM). This is due to the hybrid plastic granules which were better dispersed into the binder matrix and increased the percentage recovery.

Figure 13:
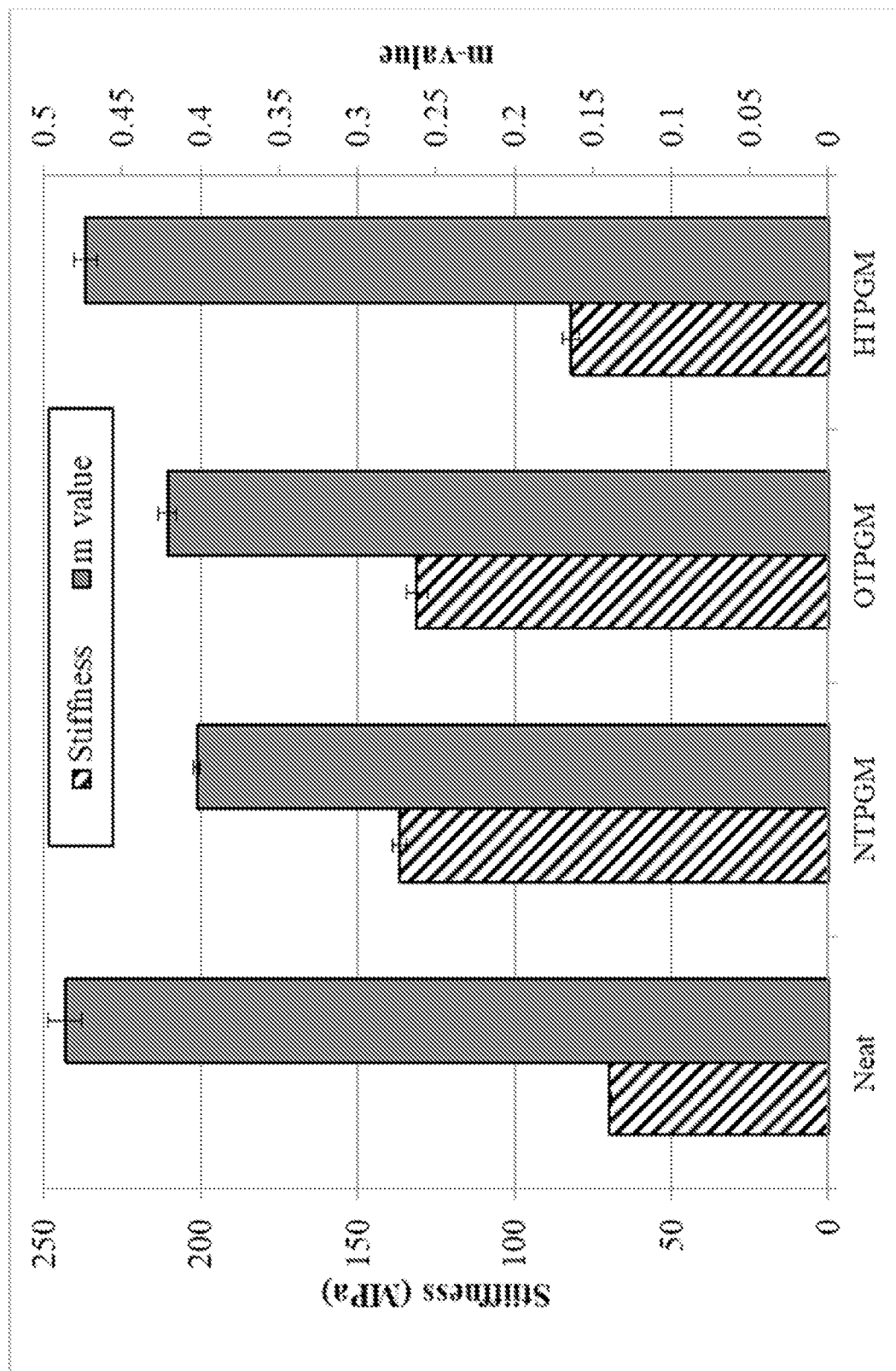
FIG. 13 shows stiffness and m-value from bending beam rheometer (BBR) tests for neat binder and NTPGM, OTPGM, and HTPGM binder samples at −12° C.

Bending Beam Rheometer test. FIG. 13 shows the results for BBR stiffness (striped) and m-value (solid) performed at sub-zero temperature, with neat, NTPGM, OTPGM, and HTPGM from left to right. For both types of plastic treatment, stiffness decreased, and stress relaxation increased compared to the non-treated plastic modifier, which is desirable. All modified binders have higher stiffness, but poorer stress relaxation compared to neat binder.

Figure 14:
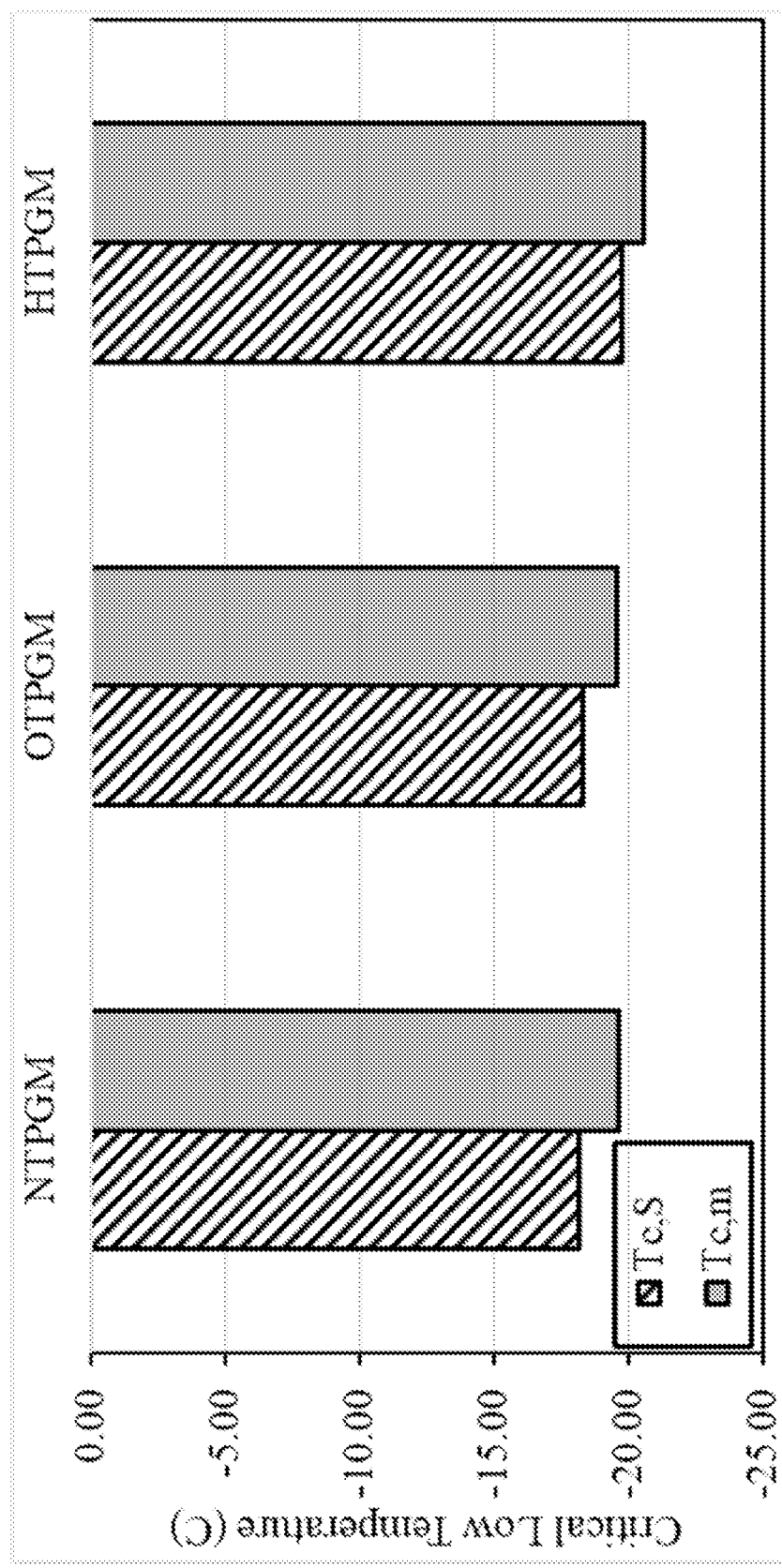
FIG. 14 shows critical stiffness temperature ($T_{c,S}$) and critical relaxation temperature ($T_{c,m}$) at −12° C. and −24° C. for NTPGM, OTPGM, and HTPGM binder samples.

FIG. 14 shows the critical stiffness temperature ($T_{c,S}$) (striped) and the critical relaxation temperature ($T_{c,m}$) (solid) from BBR tests at −12° C. and −24° C., respectively, with NTPGM, OTPGM, and HTPGM from left to right. There is not a significant difference between $T_{c,S}$ and $T_{c,m}$ for non-treated plastic granules modifier (NTPGM) and oil-treated plastic granules modifier (OTPGM). But for hybrid-treated plastic granules modifier (HTPGM), $T_{c,S}$ and $T_{c,m}$ decreased almost by 1.5° C. and 1° C., respectively, indicating the efficacy of the hybrid treatment.

Figure 15:
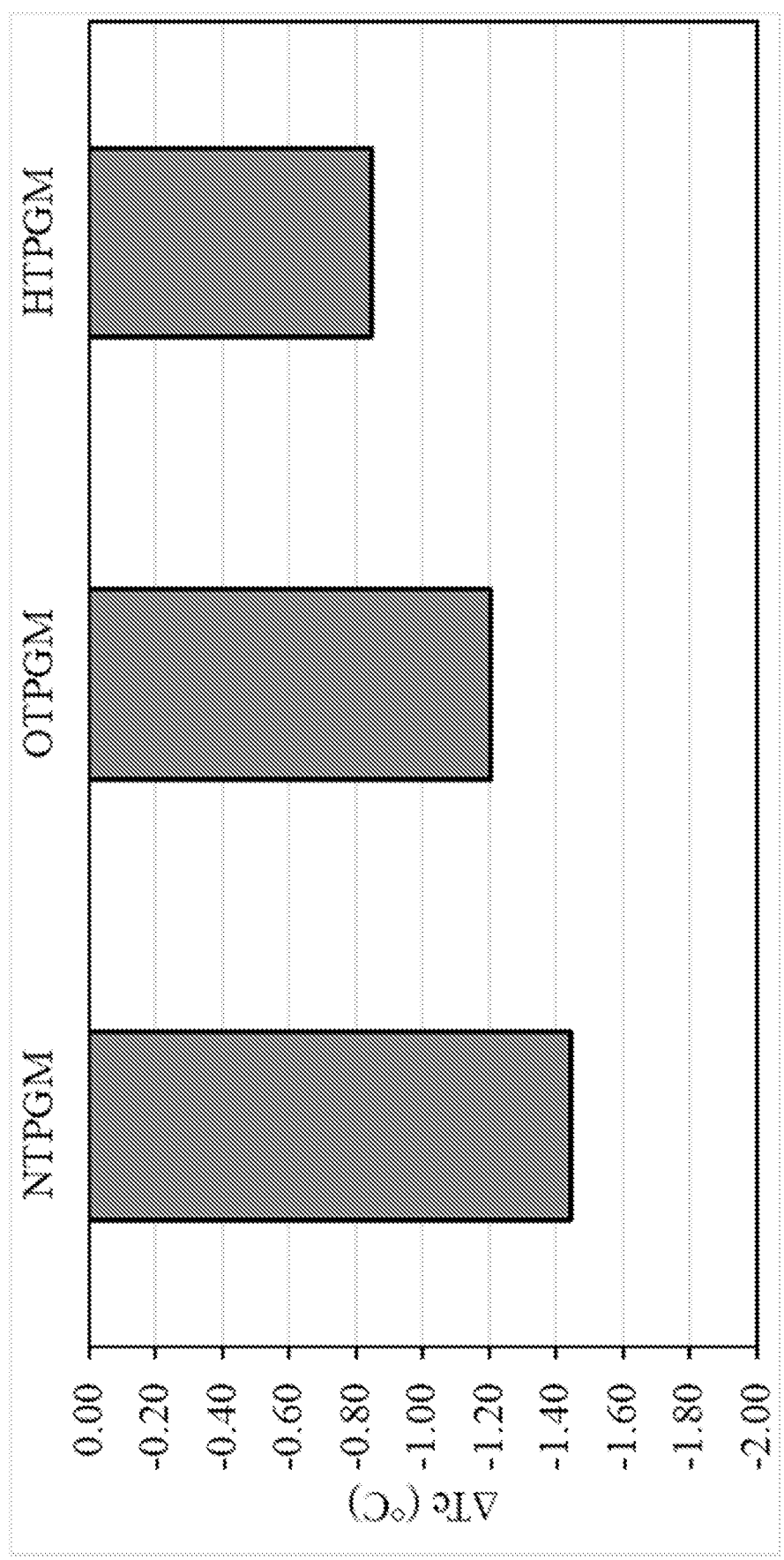
FIG. 15 shows $\Delta T_c$ for NTPGM, OTPGM, and HTPGM binder samples.

The $\Delta T_c$ is defined as the difference between the temperature at which the stiffness of binder is 300 MPa and the temperature at which the binder stress-relaxation rate (m-value) is 0.3. A higher $\Delta T_c$ typically indicates more susceptibility to fatigue cracking. From FIG. 15, it is seen that the $\Delta T_c$ for asphalt containing non-treated plastic granules (NTPG) is −1.45° C. and for oil-treated plastic granules (OTPG) and hybrid-treated plastic granules (HTPG) are −1.2° C. and −0.85° C., respectively, from left to right. Thus, the hybrid treatment shows improvement compared to other scenarios.

Figure 16:
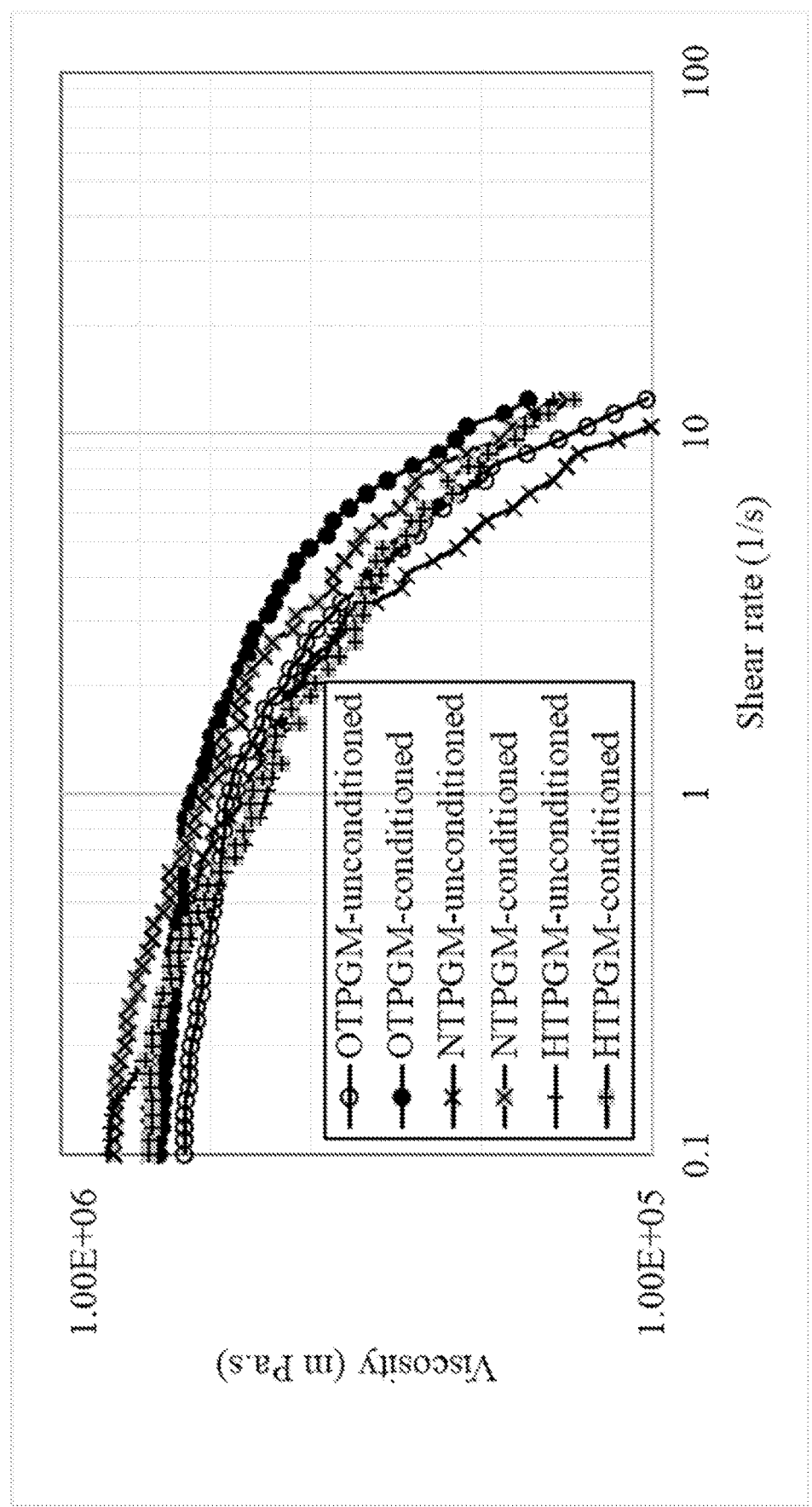
FIG. 16 shows unconditioned and conditioned shear-thinning behavior for conditioned and unconditioned NTPGM, OTPGM, and HTPGM binder samples.

Moisture-Induced Shear-Thinning Index (MISTI). To measure the effect of water on binder-aggregate interactions, non-treated plastic granules modifier (NTPGM) oil-treated plastic granules modifier (OTPGM), and hybrid-treated plastic granules modifier (HTPGM) samples were blended with glass beads (50% by weight) to perform the MISTI test. FIG. 16 shows the data for the unconditioned and moisture-conditioned shear-thinning behavior of all plastic-modified binders. In FIG. 16, open and solid circles denote unconditioned and conditioned OTPGM, respectively; open and solid x's denote unconditioned and conditioned NTPGM, respectively; and narrow and wide slash marks denote unconditioned and conditioned HTPGM, respectively. Table 4 shows the moisture-induced shear-thinning index for NTPGM, OTPGM and HTPGM. It should be noted that only control sample (non-treated plastic granule modifier) and hybrid-treated plastic granule modifier is showing steeper slope (higher value) after moisture conditioning with the changes being most evident in control sample. Whereas oil-treated plastic granule modifier has a lower slope after moisture conditioning. The inclusion of oil-treated plastic granule appeared to influence the binder and glass beads interaction whereas inclusion of hybrid-treated plastic granules had less influence on the binder and glass beads interaction.

TABLE 4

Power-Law Slope and MISTI values for treated and non-treated plastic-modified binders.

| | | Unconditioned | Conditioned |
|---|---|---|---|
| NTPGM (Control) | Power-Law Slope | 1.09 | 1.27 |
| | COV (3 samples) | 8.97% | 5.62% |
| | MISTI (Unconditioned/Conditioned) | | 86% |
| OTPGM | Power-Law Slope | 1.38 | 1.15 |
| | COV (3 samples) | 2.88% | 5.17% |
| | MISTI (Unconditioned/Conditioned) | | 120% |
| HTPGM | Power-Law Slope | 1.09 | 1.16 |
| | COV (3 samples) | 6.08% | 6.37% |
| | MISTI (Unconditioned/Conditioned) | | 94% |

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of preparing treated plastic particles from waste plastic, the method comprising:
   combining waste plastic particles with bio-oil to yield a mixture;
   irradiating the mixture with microwave radiation to yield oil-treated plastic particles; and
   contacting the oil-treated plastic particles with carbon-containing nanoparticles to yield hybrid-treated plastic particles, wherein the carbon-containing nanoparticles comprise graphene nanoparticles.

2. The method of claim 1, wherein the waste plastic particles comprise mixed plastics.

3. The method of claim 2, wherein the mixed plastics comprise mixed-color polyethylene terephthalate.

4. The method of claim 1, wherein the bio-oil is derived from waste vegetable oil.

5. The method of claim 1, wherein the waste plastic particles and the bio-oil are combined in a mass ratio in a range of 2:1 to 1:2.

6. The method of claim 1, further comprising, after irradiating the mixture, allowing the mixture to cool and further irradiating the mixture to yield the oil-treated plastic particles.

7. The method of claim 1, further comprising reducing a size of the oil-treated plastic particles before contacting the oil-treated plastic particles with the carbon-containing nanoparticles.

8. The method of claim 1, wherein contacting the oil-treated plastic particles with the carbon-containing nanoparticles comprises coating the oil-treated plastic particles with the carbon-containing nanoparticles to yield a coating of the carbon-containing nanoparticles on the oil-treated plastic particles.

9. The method of claim 8, wherein a thickness of the coating is in a range between 1 nm and 20 nm.

10. The method of claim 8, wherein a thickness of the coating is in a range between 5 nm and 10 nm.

11. A method of preparing a modified binder, the method comprising:
    combining the hybrid-treated plastic particles of claim 1 with a binder to yield the modified asphalt binder, wherein the binder comprises a concrete binder or an asphalt binder, and the modified binder comprises 5 wt % to 25 wt % of the hybrid-treated plastic particles.

12. The method of claim 11, wherein the modified binder comprises 75 wt % to 95 wt % of the asphalt binder.

13. The method of claim 11, wherein the modified binder comprises 10 wt % to 20 wt % of the hybrid-treated plastic particles and 80 wt % to 90 wt % of the asphalt binder.

14. A hybrid-treated plastic particle comprising:
   a plastic particle having a bio-oil modified surface; and
   a coating comprising carbon-containing nanoparticles on the bio-oil modified surface of the plastic particle, wherein the carbon-containing nanoparticles comprise graphene nanoparticles.

15. The hybrid-treated plastic particle of claim 14, wherein a diameter of the plastic particle is in a range between 250 μm and 750 μm.

16. The hybrid-treated plastic particle of claim 14, where a thickness of the coating is in a range of 1 nm to 20 nm.

17. A modified binder comprising:
   a binder, wherein the binder comprises a concrete binder or an asphalt binder; and
   a multiplicity of the hybrid-treated plastic particles of claim 14,
   wherein the modified binder comprises 5 wt % to 25 wt % of the hybrid-treated plastic particles.

18. A composition comprising the modified binder of claim 17, wherein the composition is a concrete composition or an asphalt composition.

19. The hybrid-treated plastic particle of claim 14, where a thickness of the coating is in a range of 5 nm to 15 nm.

\* \* \* \* \*